(12) United States Patent
Zerulla

(10) Patent No.: US 12,061,147 B2
(45) Date of Patent: *Aug. 13, 2024

(54) ADDRESSABLE PLASMONIC ARRAYS

(71) Applicant: University College Dublin, National University of Ireland, Dublin, Dublin (IE)

(72) Inventor: Dominic Zerulla, Dublin (IE)

(73) Assignee: University College Dublin, National University of Ireland, Dublin, Dublin (IE)

( * ) Notice: Subject to any disclaimer, the term of this patent is extended or adjusted under 35 U.S.C. 154(b) by 360 days.

This patent is subject to a terminal disclaimer.

(21) Appl. No.: 17/619,082

(22) PCT Filed: Jun. 23, 2020

(86) PCT No.: PCT/EP2020/067513
§ 371 (c)(1),
(2) Date: Dec. 14, 2021

(87) PCT Pub. No.: WO2020/260288
PCT Pub. Date: Dec. 30, 2020

(65) Prior Publication Data
US 2022/0299439 A1 Sep. 22, 2022

(30) Foreign Application Priority Data
Jun. 26, 2019 (EP) ..................... 19182724

(51) Int. Cl.
G01N 21/552 (2014.01)
G01N 21/17 (2006.01)
G01N 21/64 (2006.01)

(52) U.S. Cl.
CPC ......... *G01N 21/553* (2013.01); *G01N 21/648* (2013.01); *G01N 2021/1731* (2013.01)

(58) Field of Classification Search
None
See application file for complete search history.

(56) References Cited

U.S. PATENT DOCUMENTS 5,341,215 A 8/1994 Seher
5,633,724 A 5/1997 King et al.
(Continued)

FOREIGN PATENT DOCUMENTS

EP 2653903 A1 10/2013
GB 2447696 A 9/2008
(Continued)

OTHER PUBLICATIONS

1 Notice of Allowance for U.S. Appl. No. 16/771,149, Dated: Jun. 2, 2022.
(Continued)

*Primary Examiner* — Hina F Ayub
(74) *Attorney, Agent, or Firm* — Hamilton, Brook, Smith & Reynolds, P.C.

(57) ABSTRACT

An imaging apparatus for imaging a sample (7) comprises an array of electronically addressable pixels (6) wherein each pixel is arranged to support a surface plasmon resonance therein to generate an evanescent electromagnetic field. This field extends transversely from the pixel so as to be salient from the array at a first side of the array for illuminating the sample at said first side. A light source (15) is arranged to illuminate the array with excitation light therewith to generate said surface plasmon resonance. An optical detector (12A, 12B, 12C) is arranged at a second side of the array which is opposite to said first side of the array for detecting optical radiation returned from the array in response to illumination of the array by said excitation light. A processing unit (4) is arranged to associate the detected optical radiation with the address of the pixel or pixels
(Continued)

within the array at which the surface plasmon resonance was generated.

13 Claims, 12 Drawing Sheets

(56) References Cited

U.S. PATENT DOCUMENTS

| | | |
|---|---|---|
| 6,331,276 B1 | 12/2001 | Takei |
| 8,009,356 B1 | 8/2011 | Shaner et al. |
| 8,537,457 B1 | 9/2013 | Ptasinski et al. |
| 8,848,495 B1 | 9/2014 | Wu et al. |
| 11,415,512 B2 | 8/2022 | Zerulla |
| 2001/0026943 A1 | 10/2001 | Dickof et al. |
| 2002/0016011 A1 | 2/2002 | Perkins |
| 2005/0112028 A1 | 5/2005 | Ohtsuka et al. |
| 2005/0248829 A1 | 11/2005 | Sawin |
| 2005/0248830 A1 | 11/2005 | Sawin et al. |
| 2006/0134669 A1 | 6/2006 | Casasanta, III |
| 2007/0188845 A1 | 8/2007 | Xu et al. |
| 2008/0064035 A1 | 3/2008 | Densham |
| 2008/0088845 A1 | 4/2008 | Ke et al. |
| 2009/0279093 A1* | 11/2009 | Van Herpen et al. ........................ B01L 3/502707 356/417 |
| 2011/0037981 A1 | 2/2011 | Zhu et al. |
| 2012/0105857 A1 | 5/2012 | Lee et al. |
| 2012/0257204 A1 | 10/2012 | Walters |
| 2018/0045861 A1 | 2/2018 | Caldwell et al. |
| 2020/0306757 A1 | 10/2020 | Lee |
| 2021/0164900 A1 | 6/2021 | Zerulla |

FOREIGN PATENT DOCUMENTS

| | | |
|---|---|---|
| WO | 9822808 | 5/1998 |
| WO | 2011155909 A2 | 12/2011 |
| WO | 2012101539 A1 | 8/2012 |
| WO | 2012138915 A1 | 10/2012 |
| WO | 2019122161 A1 | 6/2019 |
| WO | 2020260288 A1 | 12/2020 |

OTHER PUBLICATIONS

International Search Report & Written Opinion for International Application No. PCT/EP2018/086253, entitled "Addressable Plasmonic Arrays," Mailed on Mar. 25, 2019.
Patents Act 1977: Search Report under Section 17, issued by the UK Intellectual Property Office for Application No. GB 1721611.0, dated Dec. 6, 2018.
Non-Final Office Action for U.S. Appl. No. 16/771,149, consisting of 33 pages. Dated Mailed Jul. 8, 2021.
Final Office Action for U.S. Appl. No. 16/771,149, consisting of 26 pages. Dated Mailed Dec. 2, 2021.
International Search Report and Written Opinion for International Application No. PCT/EP2020067513, entitled "Addressable Plasmonic Arrays," Mailed Aug. 14, 2020.

* cited by examiner

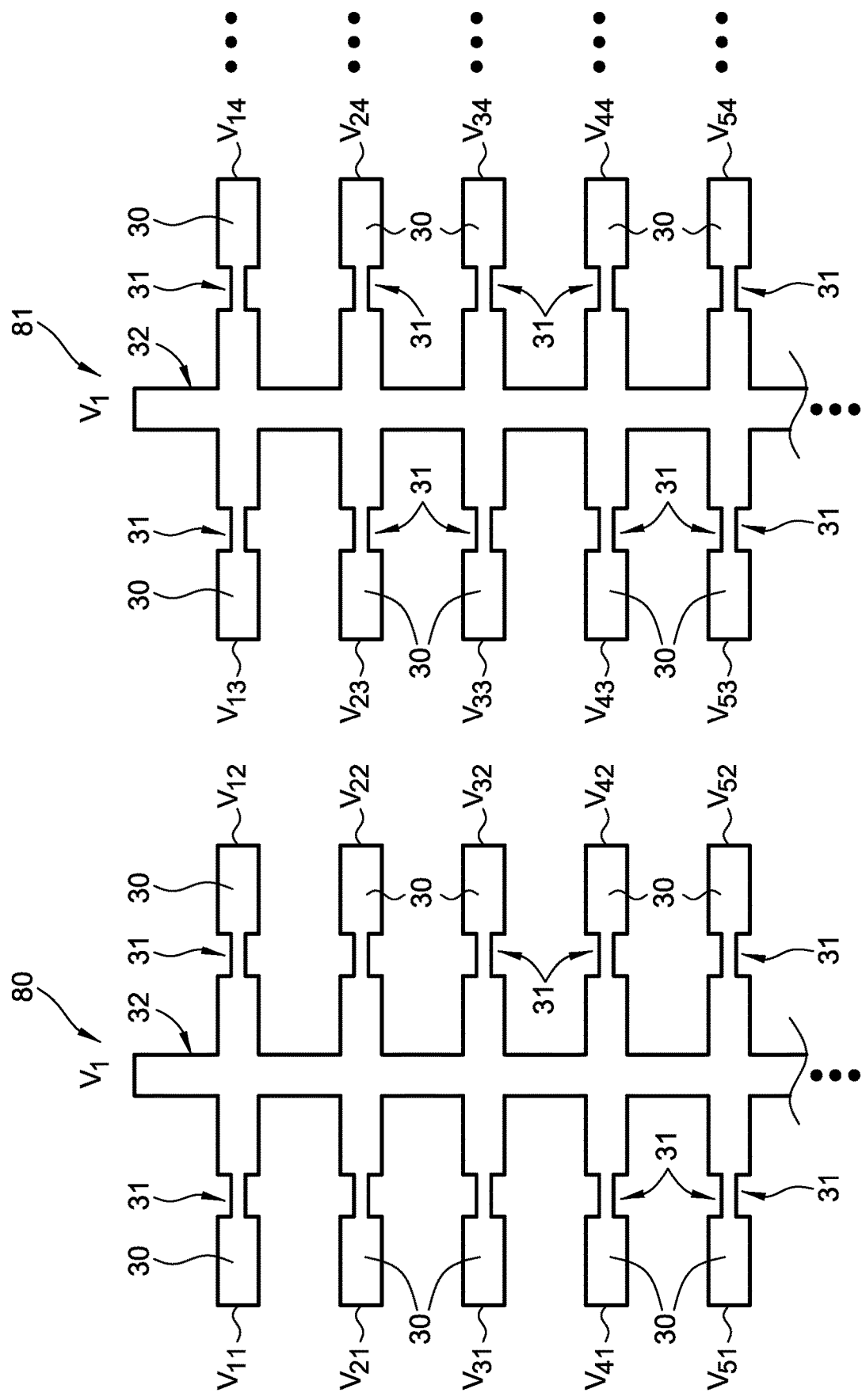

ADDRESSABLE PLASMONIC ARRAYS

This application is the U.S. National Stage of International Application No. PCT/EP2020/067513, filed Jun. 23, 2020, which designates the U.S., published in English, and claims priority under 35 U.S.C. § 119 or 365(c) to European Application No. 19182724.5, filed Jun. 26, 2019. The entire teachings of the above applications are incorporated herein by reference.

FIELD

The invention relates to addressable plasmonic arrays. In particular, the invention relates to electronically-addressable arrays of pixels or array elements at which surface plasmons are individually producible addressably and controllably. The invention may be applied to optical devices, such as super-resolution imaging devices.

BACKGROUND

The resolution of a microscope is proportional to the wavelength of the light being observed, and is inversely proportional to the size of the objective lens of the microscope. The observation of sub-wavelength structures with microscopes is difficult due to the existence of the diffraction limit. This states that light with a wavelength $\lambda$, traveling in a medium with refractive index n and converging to a spot with half-angle $\theta$, will make a spot with a radius r given by:

$$r=\lambda/[2n\ \sin(\theta)]$$

A good approximation for quantifying the resolution of an optical microscope is the value of the 'full width at half maximum' (FWHM) of the 'point spread function' of the microscope. An optical microscope, with high numerical aperture in visible light, usually reaches a resolution in the range ~200 nm to 250 nm. Consequently, ordinary optical microscopes are limited in their ability to resolve objects, by the diffraction limit, and can only resolve objects no smaller than about 200 nm.

However, in order to achieve a higher resolution, one traditionally requires either:
(a) The use of scanning near-field techniques (e.g. Atomic Force Microscopy, AFM; Scanning Tunnelling Microscopy, STM; Scanning Near-field Optical Microscopy, SNOM), in which a small probe (e.g. with dimensions if nm-scale) is brought very close to the surface of a sample, and scanned across its surface while in such close proximity. This is a slow technique due to the requirement of very close proximity of the probe to the sample surface, demanding great care and time;
(b) The use of Scanning Electron Microscopy (SEM) techniques, Transmission Electron Microscopy (TEM) techniques, or scanning ion techniques which utilize the fact that the de Broglie wavelength of charged massive particles (electrons, ions) of high velocity is much smaller that the wavelength of optical light. The result is that the diffraction limit of such particles is many orders below the diffraction limit of light. However, these techniques require the use of vacuum technologies and the expense and limitations they bring;
(c) The use of photons with relatively very short wavelengths (UV, X-rays) which have a significantly smaller diffraction limit than do photons of optical light. These techniques suffer from the difficulties associated with the creation of optical components with the required high Numerical Aperture (NA) for such short wavelengths.

However, all the above mentioned imaging methods are inferior to visible light microscopy in terms of image contrast and speed of image acquisition. The above non-optical methods also suffer from the problem of inducing changes to the sample being imaged (e.g. caused by the presence of a vacuum, or by ionizing irradiation), or the generation of potential physical artefacts in the sample (e.g. caused by close proximity physical scanning techniques).

The imaging of biological, biochemical and medically relevant samples requires spatial resolutions beyond the diffraction limit in order to unravel the mechanisms at the spatial scale of nanometres. Furthermore, biological samples, especially living cells, are best tested in-vivo or at least in-vitro without altering the samples or their mechanisms. Therefore, techniques requiring vacuum conditions (e.g. TEM; SEM; X-ray Photoelectron Spectroscopy, XPS) are not a good choice.

Sub-diffraction limited techniques include:
(a) Stimulated Emission Depletion (STED) microscopy is one of the techniques that make up super-resolution microscopy. It creates images by the selective deactivation of fluorophores (using a ring/donut-shaped laser mode), minimising the area of illumination at the focal point, and thus enhancing the achievable resolution for a given system.
(b) Scanning Near-field Optical Microscopy (SNOM) is the optical variant of Atomic Force Microscopy (AFM) and is using either a scanning optical fibre (with a sub diffraction sized apex) or a vibrating scattering tip Apertureless Scanning Near-Field Optical Microscopy (ASNOM).
(c) Stochastic functional techniques include Photo Activated Localization Microscopy (PALM) and STochastic Optical Reconstruction Microscopy (STORM) as these methods (unlike STED which is deterministic) use mathematical models to reconstruct a sub diffraction limit from many sets of diffraction limited images. Single molecule localization and composition (PALM/STORM) is a nonlinear effect based on the idea that many images can be combined to narrow stochastically the emission point spread function (i.e. reduce noise). Under conditions where all photons are emitted from the same source, a simple fitting procedure on the image, or the determination of the centre of mass, allows a more precise position determination than is possible with the uncertainty of just a single emitted photon, as represented by the width of the emission point spread function.
(d) Structured Illumination is a method which involves using a known illumination pattern which is translated and rotated across the sample surface to extract additional sub-diffraction limited information.

All of the above techniques, except SNOM/ASNOM, require the labelling of samples with a fluorophore, and are either based on model-based reconstruction of a non-sub diffracted limited image, or employ very high laser powers (e.g. STED). SNOM is a comparably slow scanning technique which is very artefact-ridden and it is difficult to obtain results routinely using this technique. Furthermore, all of the above techniques fail to provide routine access to much higher spatial resolutions than e.g. confocal microscopy. Compare typical resolutions: confocal resolution (200 nm); STED (80-100 nm). Better resolutions have only been obtained on rare occasions and in selected (sturdy) samples like vacancies in diamond. All existing techniques are expensive, slow and do not provide video-rate imaging speeds.

The invention aims to address this.

SUMMARY

At its most general, the invention addressably excites a surface plasmon and spatially correlates detected light scattered from the excited surface plasmon, by its interaction with a sample object being imaged, to the spatial address of the plasmon excitation in question and, therefore, to the location of the sample object being imaged (or a part of it). The excitation of surface plasmons may be generated in a number of ways to this end. The following are just some examples of plasmon excitation methods. For clarity, in the following, an addressable location for surface plasmon excitation is referred to as a "pixel", and a surface plasmon may be excited there using any one of the following techniques.

Surface plasmons are coherent electron oscillations that exist at an interface of a material where the real part of the dielectric function changes sign across the interface (e.g. a metal-dielectric interface, such as a metal surface in air). The charge motion in a surface plasmon creates electromagnetic fields which extend outside the metal. The total excitation, comprising both the charge motion and associated electromagnetic field, is sometimes called a surface plasmon polariton at a smooth or planar interface, or a localized surface plasmon when at the surface of a small particle or small salient surface pattern element. In the following, the term 'surface plasmon' is intended to incorporate all types of surface plasmons, including surface plasmon polaritons and localized surface plasmons.

Kretschmann Configuration: Excitation light is coupled to a conductive (e.g. metal) surface via an optically transparent optical coupling block (e.g. a prism) with a surface (typically flat) upon which the conductive surface is disposed. The optical coupling block couples light to the conductive surface via its underside, and surface plasmons may be excited in the conductive surface at its upper side (exposed), this being the surface upon which an imaged sample resides according to the present invention. A prism, such as a glass prism, may be used, however, while a prism shape is convenient, this shape is not essential. The optical coupling block matches the k-vector of the incoming light to the requirements of the surface plasmon resonance. For a given combination of materials (prism, metal layer, and sample object) and a fixed wavelength of excitation light, there exists a distinct angle at which an optimal surface plasmon excitation can be achieved. The fine tuning of this configuration can be achieved by changing the angle of incidence of the excitation light upon the conductive surface, and/or by changing the wavelength of the excitation light used. FIGS. 1 and 2, below, relate to this technique as one example.

Otto Configuration: An earlier variant of the Kretschmann configuration is the Otto configuration whereby the optical coupling block (e.g. prism) and the conductive (e.g. metal) surface are not in direct contact with each other but are separated by a small airgap (of the order of 100 nm).

Grating Excitation Configuration: Excitation light is directed to a conductive (e.g. metal) surface. If the conductive surface has a periodic structure, with a spatial period falling within a range of about $100\lambda$ to about $\lambda/100$, where $\lambda$ is the wavelength of excitation light, it can be regarded as an optical diffraction grating structure. Such a structure is also capable of delivering, to electrons on the conductive surface, an additional momentum (k-vector) required for surface plasmon excitation. In this case an optical coupling block (per the Kretschmann technique) is not strictly required and excitation can also be achieved from either side of the conductive surface, including the surface upon which an imaged sample resides according to the present invention. The fine tuning of this configuration can be achieved by changing the angle of incidence of the excitation light upon the conductive surface, and/or by changing the wavelength of the excitation light used. FIGS. 3A, 3B, 5 and 8, below, relate to this technique as examples, and the pixel structure in such examples is typically periodic and can be utilized to achieve excitation.

Localised Plasmonic Excitation Configuration: Small metallic particles (e.g. arranged in an array) or metallic surface patterns can also be made resonant with the incoming excitation light, and can create a localised surface plasmon. Such a surface plasmon is localised in the sense that, in this configuration, it cannot propagate away from the particle or pattern element. The conditions for this excitation are determined by the size and shape of the particle or surface pattern element, in relation to the wavelength of excitation light being used. If, for example, the particles or pattern elements are spherical/circular structures of a given material, then generally speaking the diameter of such a structure is the only parameter which can be varied to implement a tuning of the surface plasmon excitation, for a given wavelength of excitation light. However, if the particles or pattern elements are prolate structures (including nanorods, ellipses), then the relevant tuning parameter is not directly the absolute size or the structure, and surface plasmon excitation tuning depends on the ratio of the long axis to the short axis of the prolate structures (e.g. aspect ratio), instead.

Edge Effect Configuration: The edges of material structures, such as edges of conductive surfaces, present rapidly changing optical constants (e.g. at the edges of the pixels described herein). These edges give also rise to weaker but appreciable and useful surface plasmon excitations. FIGS. 3A, 3B, 5 and 8, below, relate to this technique as examples, and the pixel structure in such examples typically presents such edge effects.

Rough Surface Excitation: A rough conductive surface may excite surface plasmons. In particular, the spatial profile of the rough surface contains spatial 'k-vectors' (as demonstrated via Fourier transformation) which enable matching that of a surface plasmon, then the surface plasmon of that momentum may be excited by incident light directed upon the surface appropriately.

Ionising Particle Beam Configuration: Surface plasmon resonances may be excited by directing ionising particle beams at a conductive (e.g. metal) surface so as to ionise the atoms of that surface. The ionizing beam may comprise electrons, or ions, for this purpose.

Thus, it is to be understood that the generation of surface plasmon resonances on a conductive surface, may be implemented in a number of ways for use in accordance with the invention.

In an aspect of the invention, there is provided an imaging apparatus for imaging a sample comprising an array of electronically addressable pixels wherein each pixel is arranged to support a surface plasmon resonance therein to generate an evanescent electromagnetic field which extends transversely from the pixel so as to be salient from the array at a first side of the array for illuminating the sample at the first side. A light source is arranged to illuminate the array with excitation light therewith to generate the surface plasmon resonance(s). An optical detector is arranged for detecting optical radiation from (i.e. emanating from) a second side of the array which is opposite to the first side of the array, in response to illumination of the array by the excitation light. A processing unit is arranged to associate the detected optical radiation with the address of the pixel or pixels within the array at which the surface plasmon resonance(s) was generated. This arrangement means that the detection of optical radiation is not obstructed by (or if much less obstructed by) the body of the sample when disposed upon the surface of the array of pixels. This is especially the case when large sample are being imaged by the imaging apparatus in the sense that the optical radiation one wishes to detect need not pass through the bulk of a sample (where it can be attenuated) before reaching the optical detector.

The optical detector is preferably arranged for detecting excitation light reflected at the second side of the array. Detection of reflected light may be achieved in which reflected light may be internally reflected at an internal surface of an optically transparent support part (e.g. a prism or a planar optical waveguide) upon the external side of which the array of pixels may be disposed (i.e. on the external side/surface). The optical detector (e.g. a photodetector) may be situated in spaced separation from (but in optical communication with) the support part for receiving optical radiation from (i.e. emanating from) a second side of the array, via the support part. The optical detector (e.g. a photodetector) may be disposed on a surface of the support part in optical communication therewith.

The light source and the optical detector may be arranged such that excitation light is directed to be obliquely incident upon the aforesaid internal surface of an optically transparent support part. The oblique direction of incidence may be such as to cause a grazing angle of incidence, or may be such as to cause total internal reflection (TIR) of the excitation light at the internal surface. The support part may define a waveguide configured to guide the excitation light across the internal surface by a process of internal reflections within the waveguide. The evanescent field of reflecting excitation light may penetrate the internal surface of the support part from which it reflects (e.g. grazing, or TIR), so as to extend through the surface to interact with: (a) the pixels of the array to induce surface plasmons there; (b) photosensitive parts of the optical detector if the optical detector is disposed at the external side of the internal surface in question thereby allowing a proportion of the internally reflected light to be detected by the optical detector.

The imaging apparatus according may include an optically transparent light guide part upon a first surface of which the array of pixels is disposed. The optical detector is preferably disposed adjacent a separate second surface of the light guide part in optical communication with the array of pixels therethrough. In this way, the optical radiation to be detected may pass through the optically transparent light guide part towards the optical detector for detection.

The light source may be arranged to inject the excitation light into the light guide part at an angle to cause total internal reflection of the excitation light internally at the first surface sufficient to excite said surface plasmon resonance(s) in the array of pixels disposed thereupon externally. The second surface of the light guide part may be parallel to the first surface thereof. For example, both the first and second surfaces of the light guide part may be planar and mutually plane-parallel. For example, the wave guide part may comprise a planar waveguide or a slab waveguide. The light source may be arranged to inject the excitation light into the light guide part at an angle to cause total internal reflection of the excitation light internally at the second thereby to direct the reflected excitation light towards the first surface at an angle sufficient to excite the surface plasmon resonance(s) in the array of pixels disposed thereupon externally. The light guide part may be arranged to guide injected excitation light by successive total internal reflections at the first and second surfaces of the light guide part at successive parts of those surfaces along the waveguide part thereby to illuminate the array of pixels at successive parts thereof. The whole of the pixel array may be illuminated, internally via the first surface of the light guide part, in this way. That is to say, the light guide part may distribute or disperse the excitation light along the underside of the pixel array at the first surface of the light guide. The desired angle of incidence of illumination of the pixel array, by the excitation light, may be maintained along the light guide part by the specular reflection symmetry of the successive TIR reflections as between plane parallel opposing first and second internal surfaces of the light guide part.

The optical detector may be arranged to for detecting the optical radiation across an area extending over the second surface sufficient to oppose all of those parts of the first surface upon which pixels of the array of pixels are disposed. This allows for greater detection sensitivity.

The thickness of the light guide part, as between the first and second surfaces thereof, is preferably substantially uniform such that the array of pixels oppose the optical detector in parallel opposition thereto across the uniform thickness of the light guide part. This ensures that any optical attenuation that may occur as optical radiation from the pixel array passes through the body of the light guide, in a particular direction, towards the optical detector, is substantially the same irrespective of the location of the pixel of the array from which the optical radiation emanates. This may be achieved using, for example, a planar waveguide or a slab waveguide (other arrangements are possible).

The optical detector is preferably arranged for detecting luminescence light excited by the evanescent electromagnetic field in the sample at said first side of the array. Fluorescent samples, and fluorescent dyes (markers) incorporated into a given sample, may be imaged by the imaging apparatus, whereby the salient evanescent field of a selectively (addressably) excited surface plasmon at a given pixel of the pixel array, may excite fluorescence in the sample at that pixel location. The emitted optical radiation (fluorescence signal) may then be detected by the photodetector.

Of course, optical radiation may emanate from the pixel array by simple scattering of light from the salient evanescent field of a selectively (addressably) excited surface plasmon at a given pixel of the pixel array, without any fluorescence being involved, and the optical detector is preferably arranged for detecting light scattered from the evanescent electromagnetic field by the sample at said first side of the array.

The processing unit may be arranged to address a pixel to reversibly change the temperature of the pixel from a first temperature value to a second temperature value sufficiently different to the first temperature value to render said surface plasmon non-resonant or further from resonance thereby to diminish the evanescent electromagnetic field.

The processing unit may be arranged to reversibly change said temperature from the first temperature value to the second temperature value repetitively with a predetermined repetition frequency.

The processing unit may be arranged to reversibly change the temperature of a plurality of the pixels concurrently from the first temperature value to the second temperature value repetitively each with a different respective predetermined repetition frequency.

The processing unit may be arranged to detect a repetitive change in the detected optical radiation which changes with a repetition frequency corresponding to the predetermined repetition frequency associated with the addressed pixel, and to associate the detected repetitive change with the address of the addressed pixel. The optical detector may be arranged to generate a detection signal in response to detection of the optical radiation, and the processing unit may be arranged to mix the detection signal with a local oscillator signal to generate one or more beat tones (e.g. within a process of heterodyne detection, homodyne detection or using a lock-in amplifier) and to determine a magnitude of an optical signal from a selected pixel according to a selected beat tone of the one or more beat tones. The processor unit may be arranged to select the selected beat tone according to the aforesaid repetition frequency associated with that selected pixel and the frequency of the beat tone. The processing unit may be arranged to determine the magnitude of the amplitude of the optical signal from a selected pixel according to the amplitude of the selected beat tone.

The imaging apparatus may be arranged to generate surface plasmon resonances at a given pixel of the array according a configuration employing any of: a Kretschmann Configuration; an Otto Configuration; a Grating Excitation Configuration; a Localised Plasmonic Excitation Configuration; an Edge Effect Configuration; a Rough Surface Excitation configuration; an Ionising Particle Beam Configuration. The pixels of the array of pixels are preferably electrically conductive and are able to support surface plasmons on an electrically conductive surface thereof. The surface plasmons may be individually producible separately at each addressed pixel(s) of the array by addressing the array electrically. This may be done by applying an electrical signal applied to it (e.g. a voltage applied to an addressed pixel(s), and/or an electrical current flow through the body of an addressed pixel(s)) or an electrically-induced signal or interaction (e.g. an induction) applied to it. Of course, multiple separate and separated pixels of the array may be addressed simultaneously. Each pixel may be arranged to support a surface plasmon therein in the sense that the particular surface plasmon in question would become no longer supported (e.g. of insufficient strength to be of practical use, or not present at all) if it were to move outside/beyond the pixel (e.g. such as to the location of conductive electrical addressing lines of the array).

The imaging apparatus comprises a light source arranged to illuminate the array to generate a surface plasmon resonance. The light source may be arranged to illuminate the pixel array with electromagnetic radiation suitable to excite/generate surface plasmon resonances there. The surface plasmon resonance may be generated when the temperature of the pixel is a first temperature value. The temperature of an addressed pixel may be controllably changed by applying an electrical signal to it (e.g. a voltage applied to an addressed pixel(s), and/or an electrical current flow through the body of an addressed pixel(s)) to heat the addressed pixel, or by applying an electrically-controlled heating or interaction to it. If an Ionising Particle Beam Configuration is employed to excite the surface plasmons, in alternative arrangements, then the light source may be replaced with an ionising particle beam source (e.g. electron beam, ion beam). The particle beam source and pixel array may preferably be located within a vacuum chamber in such an arrangement, to permit unimpeded flow of ionising particles in the beam, in use. The light source, or particle beam, may be arranged to illuminate the array in the sense of illuminating a plurality of, or all of, the pixels of the array simultaneously such that a plurality of separate and separated surface plasmons may be generated and supported simultaneously at the plurality of separate and separated pixels of the array that are concurrently addressed electronically. The optical detector may be arranged to detect optical radiation scattered directly from the evanescent field (or optical phenomena including fluorescence which have been exited by the evanescent field) of a plasmon by the sample, and therefore the scattered radiation radiates from the scattering site towards the optical detector as a radiating electromagnetic wave as opposed to a non-radiative evanescent field which cannot radiate because it is inherently non-radiative and decays rapidly over short distances.

The processing unit may be arranged to reversibly change said temperature from said first temperature value to a second temperature value sufficiently different to the first temperature value to render said surface plasmon non-resonant (or at least further from resonance) thereby to diminish said evanescent electromagnetic field. In this way, the temperature of a pixel may be used as a control parameter to control the required conditions for resonance at the pixel and, therefore, control the ability of that pixel to support a surface plasmon resonance under current conditions. Accordingly, a controlled change in pixel temperature may be used to switch a selected pixel 'off' or 'on', as desired, in terms of the presence or strength of surface plasmons there.

Desirably, the second temperature value exceeds said first temperature value. The first temperature value may be any temperature value at or below a first temperature threshold, and the second temperature value may be any temperature value exceeding a second temperature threshold. Desirably, the second temperature threshold exceeds the first temperature threshold. Accordingly, a given pixel may be heated, or its temperature increased, in order to cause the pixel to transition from a cooler state which is better able to support a surface plasmon resonance, to a hotter state in which it is less able (or unable) to support a surface plasmon resonance, and vice versa. The cooler state may be considered to be the pixel 'on' state, and the hotter state may be considered to be the pixel 'off' state. In such a configuration, most preferably, the imaging apparatus is arranged such that the mechanism for exciting surface plasmon resonances is arranged to resonantly excite surface plasmon resonances when a given pixel is at the first temperature (or at least be closer to resonance than when the pixel is at the second temperature). This configuration is possible when the strength of coupling of the excitation mechanism (e.g. light) to surface plasmons is stronger at the lower temperature (e.g. on-resonance) than is the strength of such coupling at the higher temperature. It has been found that lower temperatures result in a stronger difference/contrast in the strength of coupling to surface plasmon resonances as between the resonant (or near-resonant) condition at the first (lower) temperature, and the non-resonant (or less near to resonant) condition at the second (higher) temperature. It is believed that the heating of a pixel changes the complex optical constants of the material(s) (thermal expansion, noise etc.) which may interfere with surface plasmon generation and, as a result, this reduces the coupling strength between the excitation mechanism (e.g. light) and the electrons at the conductive surface from which plasmons are to be generated.

Nevertheless, in alternative embodiments, the first temperature value may exceed the second temperature value.

The first temperature value may be any temperature value at or above a first temperature threshold, and the second temperature value may be any temperature value below a second temperature threshold. Desirably, the first temperature threshold exceeds the second temperature threshold. In particular, in such a configuration, the imaging apparatus may be arranged such that the mechanism for exciting surface plasmon resonances is arranged to resonantly excite surface plasmon resonances when a given pixel is at the first temperature (or at least be closer to resonance than when the pixel is at the second temperature). This may result in a sufficient difference/contrast in the strength of coupling to surface plasmon resonances as between the resonant (or near-resonant) condition at the first temperature, and the non-resonant (or less near to resonant) condition at the second temperature. Accordingly, a given pixel may be heated, or its temperature increased, in order to cause the pixel to transition from a cooler state which is less able to support a surface plasmon resonance, to a hotter state in which it is more able to support a surface plasmon resonance, and vice versa. The cooler state may be considered to be the pixel 'off' state, and the hotter state may be considered to be the pixel 'on' state. This configuration is possible when the strength of coupling of the excitation mechanism (e.g. light) to surface plasmons is stronger at the higher temperature (e.g. on-resonance) than is the strength of such coupling at the lower temperature.

The processing unit may be arranged to implement the reversible change of the temperature of an addressed pixel, from the first temperature value to the second temperature, either directly or indirectly. Indirect heating may be via a process of conductive, inductive and/or radiative heating whereby each pixel is provided with a dedicated heating element disposed adjacent to it, and in thermal communication with it. The heating elements may form an array of heating elements in a spatial distribution which substantially matches that of the array of pixels. Preferably, each heating element of the array of heating elements is spatially disposed in register with one corresponding pixel element to which it is dedicated. Thus, an address of a dedicated heating element may correspond with the address of an associated pixel. The processing unit may be arranged to address a given pixel by addressing its associated heating element to cause that heating element to heat-up and to conduct and/or radiate heat (e.g. infra-red (IR) light) to the addressed pixel with which it is in register. A heating element and its associated pixel may be electrically separated and isolated from each other e.g. via an intervening electrically insulating material between them, such as a dielectric material. The dielectric material may be optically transparent (e.g. in the IR spectrum) to permit radiative heat transfer from the heating element to the associated pixel. Preferably, each heating element is in physical contact with the intervening material, and likewise its associated pixel, and preferably the intervening material provides a bridge of thermally conductive material(s) (e.g. continuous bridge) to facilitate effective heat conduction. Direct heating may be performed electrically, using ohmic/joule heating of a pixel resulting from passing an electrical current into, through, or along the pixel.

Desirably, a said pixel comprises a portion of an electrically conductive line which may be of lower cross-sectional area than adjacent parts of the electrically conductive line either side of the pixel along the electrically conductive line. Accordingly, a pixel may be defined by a construction in a conductive path which results in a higher current density at that part of the path, when a potential difference is applied to opposite ends of the path. The increased current density produces an ohmic/Joule heating effect at the pixel. A pixel may comprise a portion of an electrically conductive line which may be of lesser width and/or thickness than adjacent parts of the electrically conductive line either side of the pixel along the electrically conductive line.

The array of pixels may comprise a plurality of separate first conductive lines each defining an addressable row in the array, wherein each first conductive line is crossed by at least one of a plurality of second conductive lines each defining an addressable column in the array. A pixel may be defined or located in a part of a first conductive line located between successive second conductive lines. Preferably, first and second conductive lines are electrically connected where (or next to where) they cross. Optionally, a first conductive line may be crossed by a plurality of second conductive lines. A pixel may be defined or located within a part of a first conductive line located between those parts thereof crossed by successive second conductive lines.

The processing unit may be arranged to apply an electrical potential(s) to an end, or each end, of a given first conductive line and/or a given second conductive line. The application of an electrical potential(s) may be controlled so as to minimise or prevent a difference in electrical potential between such ends (e.g. no net electrical voltage). The application of an electrical potential(s) may be controlled so as to change the electrical potential(s) applied to an end, or each end, of a conductive line thereby to provide a voltage between such ends. Desirably, a pixel may be addressed by controlling the electrical potential applied at an end, or each end, of at least one of the first conductive line and the second conductive line associated with the addressed pixel of the array.

Thus, for example, a selected pixel may be addressed (e.g. controlled to be 'on' or 'off' as desired) by appropriately controlling the application of electrical potential(s) to the first and second conductive lines of the array which collectively share the 'row-and-column' coordinate address of the pixel within the array. The application of an electrical potential(s) may be controlled so as to generate a voltage across an addressed pixel thereby allowing a current to flow through the addressed pixel. For example, this may be employed when current is used to heat a pixel to switch it from a more resonant 'on' state (when cooler) to a less resonant (or non-resonant) 'off' state (when heated), as described above. Alternatively, the application of an electrical potential(s) may be controlled so as to minimise or prevent a voltage across an addressed pixel. For example, this may be employed when a reduction or removal of current is used to cool a pixel to switch it from a more resonant 'on' state (when heated by current flow) to a less resonant (or non-resonant) 'off' state (when cooler, with lesser or no current flow), as described above.

A pixel may form a conductive bridge between a given first conductive line and a given second conductive line to permit a flow of current between the given first conductive line and the given second conductive line via the pixel. A given first conductive line may be electrically connected (e.g. directly, or physically) to a given second conducting line only via one or more such conductive bridges. This means that for current to flow from a given first conductive line and a given second conductive line, it must flow via a pixel joining the two conductive lines in question. An electrical insulating material may separate each of the first conductive lines from each of the second conductive lines where they overlap, to prevent electrical connection there.

Desirably, the pixel array may be formed by two overlapping arrays of conductive lines spaced apart from one another wherein a pixel is defined where one conductive line of one of the two arrays overlaps a conductive line of the other of the two arrays. The conductive lines of one or each of the overlapping arrays may be parallel. This may be conducive to a regular pixel array pattern. Alternatively, the conductive lines of one or each of the overlapping arrays may be other than parallel, such a first array comprising separate conductive lines radiating outwardly from a common focus, and the second array comprising one or more looped conductive lines (e.g. circular) which may be concentric loops centred on the common focus of the first array. Here a pixel is defined where a radial line overlaps a loop. The conductive lines within each array may be of substantially uniform width and/or thickness along their respective lengths. This means that deliberate constrictions in the cross-sectional area of a conductive line within an array may be unnecessary, as it may be unnecessary to localise the position of a surface plasmon resonance along the conductive line. This permits a surface plasmon to extent or to propagate along a length of a conductive line, within one array, which is overlapped by a plurality of the conductive ines of the other array of the two overlapping arrays. Preferably, the two arrays are not electrically in contact or connection, such that a conductive line of either one of the two arrays is electrically addressable independently of the other. The addressing of a conductive line may comprise applying an electrical potential difference along the conductive line. This may preferably cause a current to flow along the conductive line, to heat it ohmically (a.k.a. Joule heating).

Accordingly, a surface plasmon excitation may be generated on a selected conductive line of one of the two arrays. Subsequently, a surface plasmon excitation may be generated on a selected conductive line of the other of the two arrays. If an imaged object (or a part of it) is present at a location along any part of the addressed conductive line of the first array, then a signal of light may be scattered from the surface plasmon upon that line as it interacts with the object, and this may be detected. Subsequently, if that imaged object (or a part of it) is present at a location along any part of the addressed conductive line of the second array, then a signal of light may be scattered from surface plasmon upon that line as it interacts with the object. Again, this may be detected. If scattered light is detected when the conductive line of the first array is addressed in this way, and is detected when the conductive line of the first array is addressed, then this means that the imaged object (or a part of it) must be present where both of the two conductive lines are present within the filed of view of the optical detector (e.g. a plane to which both arrays may be parallel)—that is the location where the two conductive lines are seen to cross, within the field of view of the optical detector.

The two overlapping arrays of conductive lines (e.g. parallel) may be spaced apart from one another by an intervening layer of dielectric material (e.g. a glass). The intervening dielectric layer may be optically transparent. This maintains a desired separation between the two arrays without impeding the generation of surface plasmons in each (e.g. via an incident optical excitation light). The spacing between the two arrays may be of the order of 50 nm or 100 nm (e.g. between 50 nm and 200 nm), and may be a substantially uniform spacing as between the two arrays at any opposing parts thereof.

A pixel, or each pixel, or an/each conductive line of the array, may comprise a metal. The metal may be a metal selected from: Gold, Silver, Copper, Aluminium, Magnesium. The choice of metal may depend on the wavelength of the excitation light employed to excite a surface plasmon upon the metal. For example, Aluminium and Magnesium are more effective at generating surface plasmons when the excitation light is blue or ultraviolet (UV) light. Conductive lines or the array, or pixels of the array, or conductive lines of the array comprising pixels of the array, may desirably be disposed upon a surface of a dielectric material. The dielectric material may desirably be optically transparent. The dielectric material may desirably be a glass, or a plastic.

When the imaging apparatus comprises a light source arranged to illuminate the pixel array with excitation electromagnetic radiation to generate surface plasmon resonances there, the excitation electromagnetic radiation may have a wavelength range in any suitable wavelength of interest. Suitable wavelengths may be in one of the following electromagnetic wavelength ranges: radio-frequency (RF), microwave, infra-red (IR), near-infrared (NIR), visible, ultraviolet (UV). It is desirable to enhance the achievable contrast for imaging using the scattered light that is radiated from surface plasmons when they interact with the sample at a pixel. Preferably, the wavelength of the excitation light is a wavelength which produces the greatest change in the electric field in the optical near-field generated at the addressed pixel(s) for a given (e.g. minimal) change in electrical current applied to the addressed pixel(s). Such a wavelength of excitation light may be a wavelength at or close to the plasma edge of the chosen material (e.g. metallic material) of the pixel(s). This edge is well-known as being identifiable in the reflection spectrum excitation light reflected from the pixel(s) and occurs where the reflectivity starts to drop quickly when the excitation wavelength becomes shorter. This is a result of the limited mobility of the electrons in the material (e.g. metal) of the reflecting pixel. The plasma edge is found for gold at wavelengths in the range 500 nm to 580 nm and for silver it is found at wavelengths in the range between 300 nm and 380 nm. Other metals have their plasma edge further in the UV (e.g. Al, Mg) or shifted to longer wavelength (e.g. Cu). Furthermore, metallic alloys (e.g. a binary gold-silver alloy) may be used as the material of the pixels in order to select/tune the plasma edge wavelength between those of the pure elements that the alloy is made of. Furthermore, transparent conducting oxide materials (e.g. Indium Tin Oxide, ITO) may be employed.

The imaging apparatus may be configured to generate a surface plasmons at a pixel with an evanescent field which extends to a height of at least 10 nm, or at least 20 nm above the surface of a pixel whereat the electric field strength thereof (e.g. absolute field strength) is to not less than 1/e (e=2.71828 . . . ) of its value as at the pixel surface. Preferably, this height may be at least 30 nm, or at least 50 nm, or at least 100 nm, or at least 200 nm. This height may be a height within the range 25 nm to 50 nm, for example, or may be a height within the range 75 nm to 125 nm. The magnitude of the evanescent filed decays exponentially with perpendicular distance away from the surface supporting it. Different materials (e.g. metals) are more effective than others in supporting stronger surface plasmons having a larger 1/e decay length/height. For example, the 1/e decay height of surface plasmons on a Gold or Silver surface may be, in preferred embodiments, between about 75 nm and about 125 nm. However, in other preferred embodiments, wherein Magnesium or Aluminium is used as the material of the pixels, instead of the Gold or Silver, the 1/e decay height of surface plasmons on the pixel surface may be between about 25 nm and about 50 nm. The invention, in preferred embodiments, is able to induce large changes in the electric field strength of an evanescent field of a generated surface plasmon, which are several orders of magnitude greater than could be induced randomly by ambient natural phenomena.

A pixel of the array, or each pixel of the array, may be dimensioned such that the greatest dimension thereof (length, or width) does not exceed 500 µm, or preferably does not exceed 250 µm, or preferably does not exceed 100 µm, or preferably does not exceed 50 µm, or preferably does not exceed 25 µm, or preferably does not exceed 10 µm, or preferably does not exceed 500 nm, or preferably does not exceed 250 nm, or preferably does not exceed 100 nm, or preferably does not exceed 75 nm, or preferably does not exceed 50 nm, or preferably does not exceed 30 nm, or preferably does not exceed 10 nm, or preferably does not exceed 1 nm. A pixel of the array, or each pixel of the array, may be dimensioned such that the greatest dimension thereof (length, or width) does not exceed the value of the wavelength of the illumination light generated for illuminating the array to generate surface plasmons.

Desirably, the pixel array comprises at least 9 pixels (e.g. a 3×3 array), or at least 20 pixels, or at least 50 pixels, or at least 100 pixels, or at least 500 pixels, or at least 1000 pixels, or at least 5000 pixels, or at least one million pixels. The pixel array may comprise a rectangular (e.g. square, or otherwise) array of pixels numbering at least 10 pixels on each side (e.g. 10 (at least)×10 (at least), or at least 100 pixels on each side (e.g. 100 (at least)×100 (at least), or at least 1000 pixels on each side (e.g. 1000 (at least)×1000 (at least). The pixel array may be substantially planar. The pixel array may be disposed upon a substantially planar surface (e.g. a dielectric surface). The pixel array may be exposed to the ambient environment, for receiving a sample (to be imaged) directly thereupon, or may be covered by a protective covering (e.g. a dielectric material), which is preferably optically transparent, such as a glass or plastic protective covering.

The light source may be configured for outputting illumination light with which to illuminate the array at a controllably adjustable angle of incidence thereupon. The processing unit may be arranged to vary the angle of incidence whilst the light source illuminates the array, to determine the angle of incidence at which the detected optical radiation associated with an addressed pixel is maximised.

The optical detector may comprise a photodetector responsive to light scattered from the evanescent electromagnetic field of a surface plasmon generated upon the array by the light source. The optical detector may comprise an optical focusing part(s) arranged to focus upon the photodetector light which is scattered from the evanescent electromagnetic field of a surface plasmon generated upon the array by the light source. The light source may comprise a laser for outputting the illumination light.

The imaging apparatus may comprise said array of pixels disposed over (e.g. upon) a surface of an optical coupling block, whereby the light source is arranged to illuminate the array of pixels via transmission of illumination light through the optical coupling block. The imaging apparatus may comprise the pixel array and the optical coupling block configured in a Kretschmann configuration, or an Otto configuration. The light source may be arranged to direct the illumination light an internal angle of incidence to the surface of the optical coupling block, within the optical coupling block, to achieve total internal reflection (TIR) thereat. The imaging apparatus may comprise a second optical detector arranged to receive illumination light reflected (e.g. by TIR) from the internal surface of the optical coupling block, and the processing unit may be arranged to vary the angle of incidence of the illumination light whilst the light source illuminates the array, to determine the angle of incidence at which the intensity of reflected illumination light is minimised. In this way, the second optical detector may be used to identify, and fine-tune, the angle of incidence of illumination light required to achieve the strongest coupling of the illumination light to surface plasmons—i.e. the intensity of reflected illumination light is minimised, since a maximal amount of energy is coupled from the illumination light to the electrons at the surface of the pixel array to generate surface plasmons resonantly. Additionally, subsequent to the resonance fine-tuning, when in normal operation, the second optical detector may be used to yield reflection-dependent optical constants as independent information about the sample at the same spatial resolution as the first optical detector.

The invention may be operated/used in the ambient atmospheric environment. It may be used without labelling of molecules. However, if labelling of molecules is used, then the generated surface plasmons of the invention can be used to excite the labelled molecules and further increase the intensity of detected light scattered from a surface plasmon due to its interaction with a sample (i.e. the labelled molecules within the sample) The invention may be used with low laser powers (or other light sources, including LEDs). It is easy to integrate into existing optical microscopes, and requires relatively low cost. The imaging method is a fast technique which will allow for video rate (or faster) imaging of nano-scale processes.

Optionally, an optically transparent dielectric cover layer may be disposed over the top of the pixel array(s) as a protective layer. In some embodiments, this may result in the pixel layer being sandwiched between two dielectric layers collectively acting as a waveguide. This may assist in coupling excitation light to the pixel array to more efficiently generate surface plasmons there.

In the imaging apparatus the second temperature value, referred to above, may exceed said first temperature value. A said pixel may comprise a portion of an electrically conductive line which is of lower cross-sectional area than adjacent parts of the electrically conductive line either side of the pixel along the electrically conductive line. The pixel array may be formed by two overlapping arrays of conductive lines spaced apart from one another wherein a pixel forms a conductive bridge electrically connecting a conductive line of one of the two arrays to a conductive line of the other of the two arrays. The pixel array may be formed by two overlapping arrays of conductive lines spaced apart from one another wherein a pixel is defined where one conductive line of one of the two arrays overlaps a conductive line of the other of the two arrays.

In another aspect of the invention, there is provided an imaging method for imaging a sample comprising the steps of: providing an array of electronically addressable pixels wherein each pixel is arranged to support a surface plasmon resonance therein to generate an evanescent electromagnetic field which extends transversely from the pixel so as to be salient from the array at a first side of the array for illuminating the sample at said first side; illuminating the array with excitation light to generate said surface plasmon resonance(s); electronically addressing a said pixel(s); detecting optical radiation from a second side of the array which is opposite to said first side thereof, in response to illumination of the array by said excitation light; associating the detected optical radiation with the address of the pixel or pixels within the array at which the surface plasmon resonance was generated.

The method may include detecting excitation light reflected at said second side of the array.

The step of illuminating the array of pixels may include optically guiding excitation light through an optically transparent light guide part upon a first surface of which the array of pixels is disposed and said detecting is performed via a separate second surface of the light guide part in optical communication with the array of pixels.

The method may include injecting said excitation light into the light guide part at an angle to cause total internal reflection of the excitation light internally at the first surface sufficient to excite said surface plasmon resonance(s) in the array of pixels disposed thereupon externally.

The method may include detecting said optical radiation across an area extending over said second surface sufficient to oppose all of those parts of the first surface upon which pixels of the array of pixels are disposed.

The detecting may comprise detecting luminescence light excited by the evanescent electromagnetic field in the sample at said first side of the array.

The detecting may comprise detecting light scattered from the evanescent electromagnetic field by the sample at said first side of the array.

The method may include addressing a said pixel to reversibly change the temperature of the pixel from a first temperature value to a second temperature value sufficiently different to the first temperature value to render said surface plasmon non-resonant or further from resonance thereby to diminish said evanescent electromagnetic field.

The method may include reversibly changing said temperature from said first temperature value to said second temperature value repetitively with a predetermined repetition frequency.

The method may include reversibly changing said temperature of a plurality of said pixels concurrently from said first temperature value to said second temperature value repetitively each with a different respective predetermined repetition frequency.

The method may include detecting a repetitive change in the detected optical radiation which changes with a repetition frequency corresponding to the predetermined repetition frequency associated with the addressed pixel, and associating the detected repetitive change with the address of the addressed pixel.

The method may comprise illuminating the array to generate said surface plasmon resonance when the temperature of said pixel is a first temperature value; reversibly changing said temperature from said first temperature value to a second temperature value sufficiently different to the first temperature value to render said surface plasmon non-resonant or further from resonance thereby to diminish said evanescent electromagnetic field. The second temperature value may exceed the first temperature value.

A pixel may comprise a portion of an electrically conductive line which is of lower cross-sectional area than adjacent parts of the electrically conductive line either side of the pixel along the electrically conductive line. The pixel array may be formed by two overlapping arrays of conductive lines spaced apart from one another wherein a pixel forms a conductive bridge electrically connecting a conductive line of one of the two arrays to a conductive line of the other of the two arrays. The conductive lines of/within one or each array may be parallel. The pixel array may be formed by two overlapping arrays of conductive lines spaced apart from one another wherein a pixel is defined where one conductive line of one of the two arrays overlaps a conductive line of the other of the two arrays. The conductive lines of one or each of the overlapping arrays may be parallel. Alternatively, the conductive lines of one or each of the overlapping arrays may be other than parallel, such a first array comprising separate conductive lines radiating outwardly from a common focus, and the second array comprising one or more looped conductive lines (e.g. circular) which may be concentric loops centred on the common focus of the first array. Thus, a pixel may be defined where a radial line overlaps a loop.

The method may include injecting excitation light into the light guide part at an angle to cause total internal reflection of the excitation light internally at the first surface sufficient to excite said surface plasmon resonance(s) in the array of pixels disposed thereupon externally. The method may include detecting said optical radiation across an area extending over said second surface sufficient to oppose all of those parts of the first surface upon which pixels of the array of pixels are disposed. The detecting step may comprise detecting luminescence light excited by the evanescent electromagnetic field in the sample at said first side of the array. The detecting step may comprise detecting light scattered from the evanescent electromagnetic field by the sample at said first side of the array.

The method may include addressing a said pixel to reversibly change the temperature of the pixel from a first temperature value to a second temperature value sufficiently different to the first temperature value to render said surface plasmon non-resonant or further from resonance thereby to diminish said evanescent electromagnetic field. The method may include reversibly changing said temperature from said first temperature value to said second temperature value repetitively with a predetermined repetition frequency. The method may include reversibly changing said temperature of a plurality of said pixels concurrently from said first temperature value to said second temperature value repetitively each with a different respective predetermined repetition frequency.

The method may include detecting a repetitive change in the detected optical radiation which changes with a repetition frequency corresponding to the predetermined repetition frequency associated with the addressed pixel, and associating the detected repetitive change with the address of the addressed pixel. In the method, the aforesaid second temperature value may be selected to exceed said first temperature value.

In the method, a said pixel may comprise a portion of an electrically conductive line which is of lower cross-sectional area than adjacent parts of the electrically conductive line either side of the pixel along the electrically conductive line. In the method, the pixel array may be provided by two overlapping arrays of conductive lines spaced apart from one another wherein a pixel forms a conductive bridge electrically connecting a conductive line of one of the two arrays to a conductive line of the other of the two arrays. In the method, the pixel array may be provided by two overlapping arrays of conductive lines spaced apart from one another wherein a pixel is defined where one conductive line of one of the two arrays overlaps a conductive line of the other of the two arrays.

The method may be implemented using the apparatus described above.

BRIEF DESCRIPTION OF DRAWINGS

FIG. 1B schematically shows components of the imaging apparatus according to

FIG. 1A;

FIG. 5 schematically illustrates an array of electronically addressable pixels within the imaging apparatus of FIG. 1A, 1E, 11 or 12, according to an alternative embodiment;

DESCRIPTION OF EMBODIMENTS

Figure 1A:
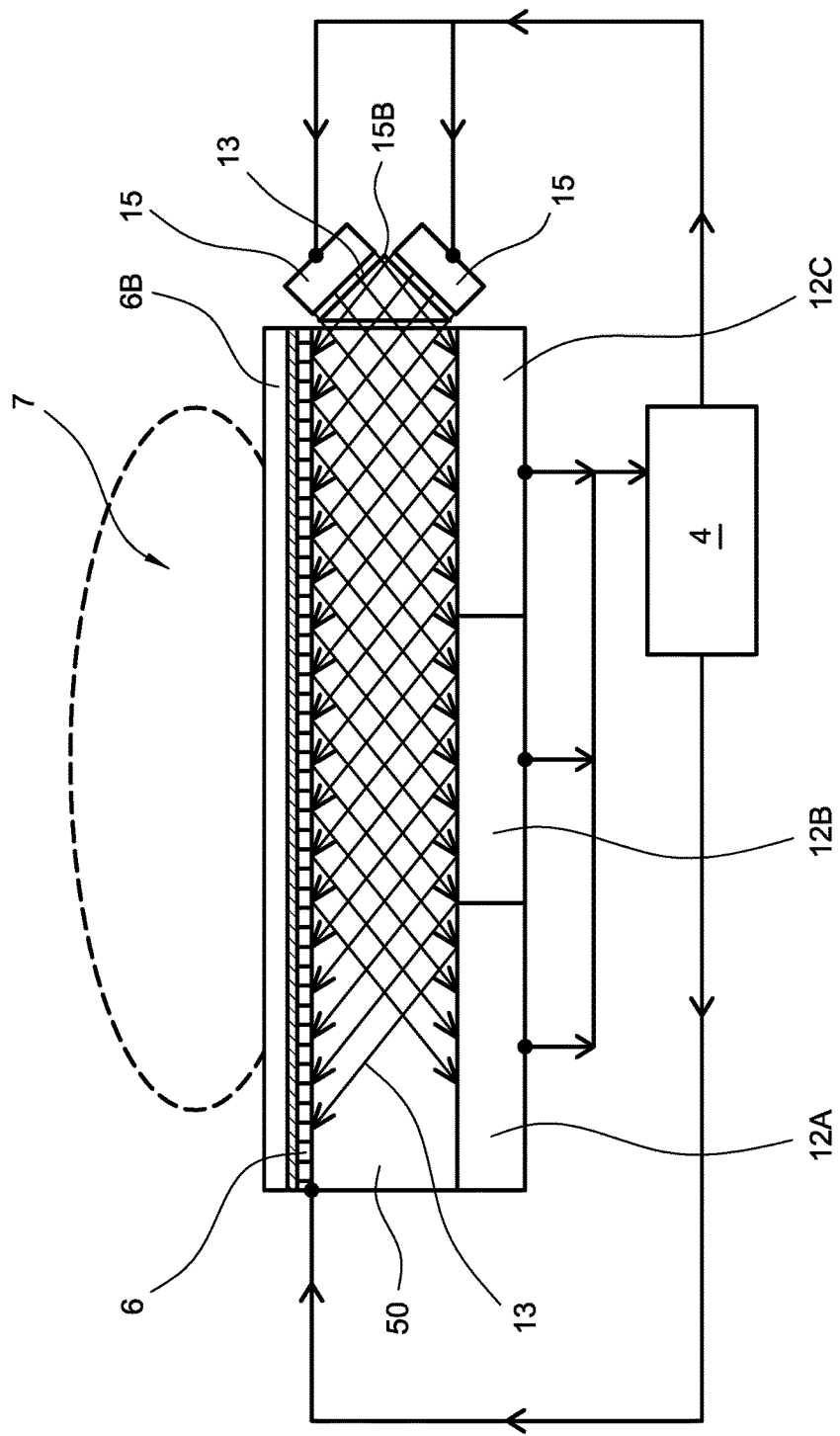
FIG. 1A schematically illustrates an imaging apparatus according to an embodiment of the invention.

In the drawings like items are assigned like reference symbols, for consistency.

Referring to FIG. 1A, there is shown, schematically and in cross-section, and example of an imaging apparatus for imaging a sample (7), such as a biological sample. The imaging apparatus includes a planar optical waveguide (50) upon one planar surface of which is formed a planar array (6) of electronically addressable pixels. Each pixel of the array of pixels is arranged to support a surface plasmon upon its surface, and in doing so to generate an evanescent electromagnetic field (not shown, see item 8 of FIG. 4) which extends transversely from the pixel so as to be salient, or standing proud, from the plane of the array of pixels.

A light source (15), such as a laser or a light-emitting diode (LED), is arranged to direct optical radiation (13) into the planar optical waveguide (50) at an angle sufficient to cause total internal reflection (TIR) between the opposing plane-parallel internal surfaces of the planar waveguide across one of which (externally) the array of pixels is disposed in optical communication therewith. As a result, light injected into the planar waveguide are caused to be guided through the planar waveguide in such a way as to illuminate the underside of the array of pixels (6) at the interface between the array and the surface of the optical waveguide supporting it.

Specular reflection occurs at the interface between the array of pixels and the surface of the waveguide supporting pixels, resulting in deflection of the incident optical radiation at an angle of reflection matching the angle of incidence, measured relative to the direction perpendicular to the reflecting surface. The reflected light is directed towards the opposing plane-parallel internal surface of the planar optical waveguide whereupon total internal specular reflection (TIR) occurs at the same aforementioned angle of reflection, so as to return the reflected light back towards another portion of the internal surface of the planar waveguide further along the waveguide upon which another portion of the array of pixels is supported.

Once back at the internal surface of the waveguide bearing the pixel array, the light repeats the aforementioned process of total internal reflection to continue to propagate along the planar optical waveguide by repeatedly illuminating the underside of the array of pixels disposed on one surface of the waveguide. In this way the injected light is caused to illuminate the pixel array across a wide area.

The light source may comprise a plurality of light emitting portions each disposed to inject light into the planar optical waveguide at a different respective angle of injection relative to the plane of the waveguide, or/and each disposed to inject light into the planar optical waveguide so as to initially totally internally reflect from different/opposite opposing internal surfaces of the waveguide. This latter arrangement is schematically illustrated in FIG. 1A whereby an upper light emitting portion is disposed to inject light obliquely towards the lower internal surface of the planar waveguide upon which the pixel array is not disposed, such that the injected light is initially reflected from the lower internal surface towards the upper internal surface of the waveguide upon which the array of pixels is disposed.

Simultaneously, a lower light emitting portion is disposed to inject light obliquely towards the upper internal surface of the waveguide upon which the pixel array is disposed, for initial internal reflection there. Subsequently, multiple internal reflections of light injected by both the upper light emitting portion and the lower light emitting portion fully base the underside of the array of pixels as a schematically illustrated in FIG. 1A. A coupling prism (15B) is disposed between the edge of the planar waveguide and the upper and lower light emitting portions simultaneously.

In particular, the hypotenuse of a coupling prism is abutted against the plane surface of the edge of the planar waveguide, and the remaining two mutually perpendicular planar sides of the prism have a respective one of the upper and lower light-emitting portions disposed or abutted against them such that light emitted from a respective light emitting portion enters the coupling prism through the abutting surface of the coupling prism to subsequently traverse the prism and enter the planar waveguide through the surface of the hypotenuse of the coupling prism.

Preferably the refractive index of the material of the coupling prism is the same as or similar to the refractive index of the material of the planar optical waveguide. This similarity or matching of refractive indices assists in reducing optical losses by reflection at the edge of the planar waveguide. Most preferably, and to reflecting optical coatings may be disposed across the surfaces of the coupling prism and the edge of the planar waveguide through which light from the light source is intended to pass.

A photodetector is disposed across the external planar surface of the optical waveguide opposite to the planar waveguide surface upon which the pixel array is disposed. The photodetector is configured to define a substantially planar photo detecting surface having substantially the same area as the area of the pixel array, and arranged in register with the pixel array such that each part of the pixel array is opposed by a part of the photodetector. In the example shown in FIG. 1A, comprises three separate photodetector sub-sections (12A, 12B, 12C) which each act independently of the other to detect optical radiation emanating from the direction of the pixel array (6).

In alternative arrangements a single, larger photodetector may extend across the whole of the photo-detecting area. Each photodetector subsection is responsive to optical radiation emanating from the pixel array, by generating a detection signal. It is to be noted that each subsection array need not comprise a multi-pixel detector surface and may simply comprise a large-area detector arranged to generate a single detection signal in response to detection of optical radiation at any point within is detecting surface area. In other words, the photodetector, and each photodetector subsection is not arranged to determine or record a location upon the photodetector surface at which light is received from the pixel array (6). Instead, the photodetector is simply arranged to produce a detection signal indicating that light has been received at the photodetector irrespective of where upon the photodetector it was received. The magnitude of the detection signal is proportional to the intensity of the detected light in question.

Indeed, an image of the sample (7) is formed by an appropriate control of addressed drive signals applied to specified pixels of the array of pixels (6), and an appropriate processing of light detected by the photodetector as emanating from the pixel array (6) in response to the addressed drive signals, as is explained in more detail below.

Optical radiation emanating from the pixel array (6) and instant upon the photodetector light-sensitive elements causes electrical detection signals to be generated by the photodetector which are input to a processing unit (4). The processing unit is also arranged to issue illumination control signals to the light source (15) with which to control the light source to switch on/off to controllably inject light (13) into the planar optical waveguide (50) as desired.

The processing unit (4) is arranged to selectively electronically address individual pixels, or groups of pixels, of the array of electronically addressable pixels (6) so as to cause the addressed pixels to generate (or annihilate) surface plasmons therein, and associated salient evanescent electromagnetic fields (8). The processing unit (4) is also arranged to receive a consequential electrical signal input from the photodetector unit (12) generated in response to having optically addressed one or more of the pixels of the pixel array (6). The processing unit is arranged to associate the received electrical signal, which is generated in response to detection of an optical signal emanating from the pixel array, with the array address of the pixel of pixels that had been addressed by the processing unit.

The precise location and position upon the pixel array of each addressed pixel may either be:
  (a) predetermined/known at the time of addressing the pixel or pixels in question, or
  (b) determined after having addressed the pixel or pixels in question by a process of applying appropriate pixel drive signals and appropriate subsequent photodetector signal processing.

Figure 1B:
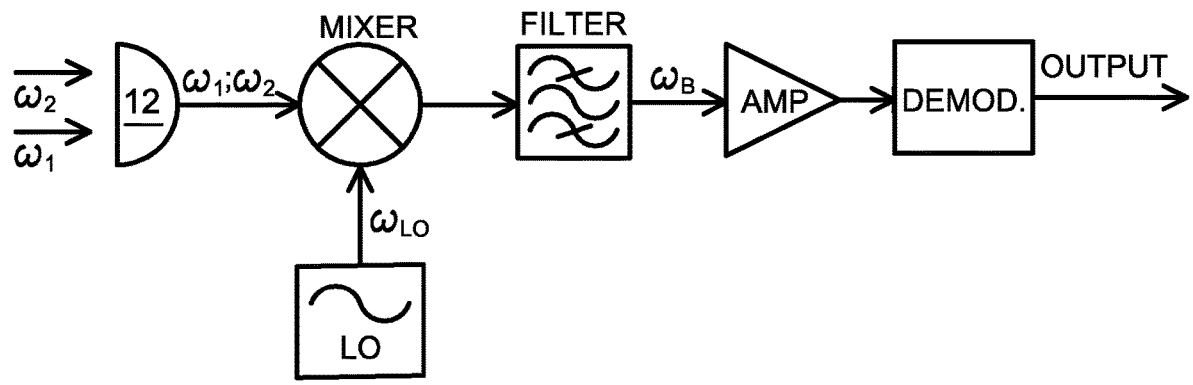
Figure 1C:
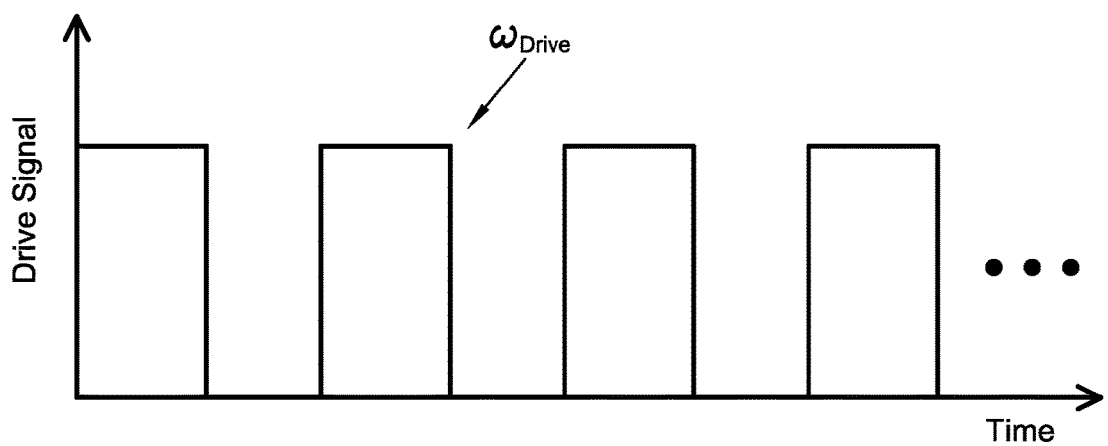
FIGS. 1C and 1D show a pixel drive pulse train/modulation, and a consequent detected optical signal, respectively.
Figure 1D:
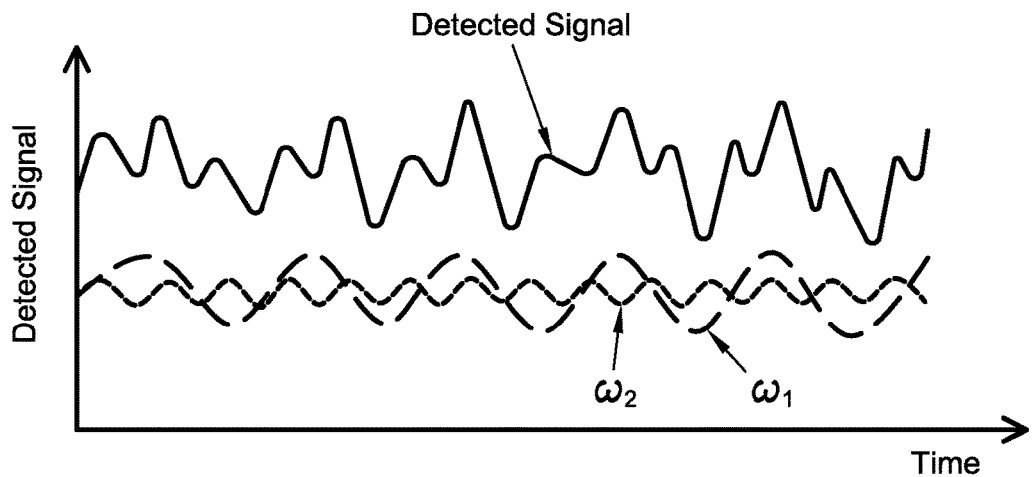

In the example illustrated in FIG. 1A, with reference to FIGS. 1B, 1C and 1D, the latter addressing method (b) is employed as described herein, as an illustrative example.

Figure 1E:
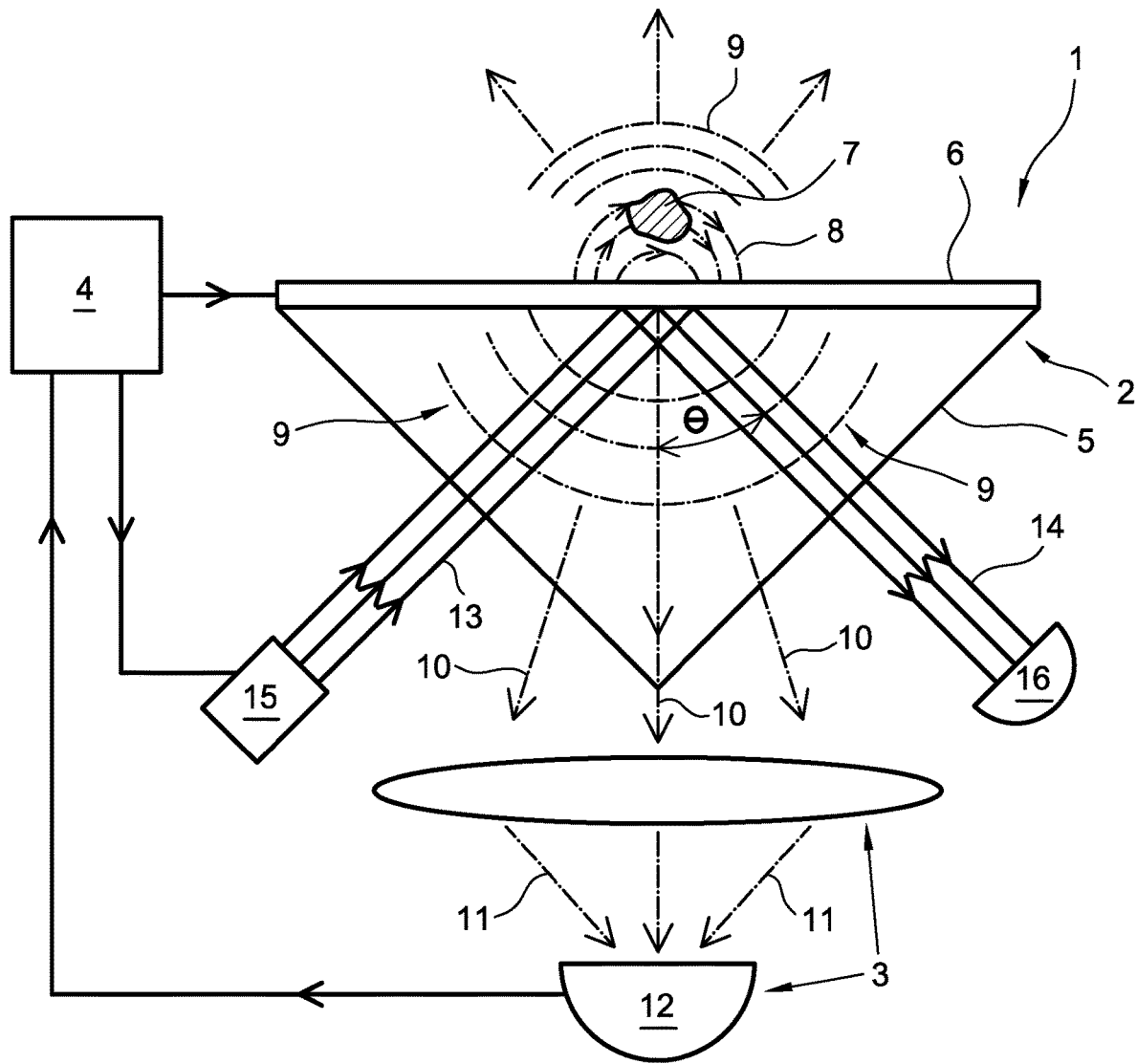
FIG. 1E schematically illustrates an imaging apparatus according to an embodiment of the invention.
Figure 11:
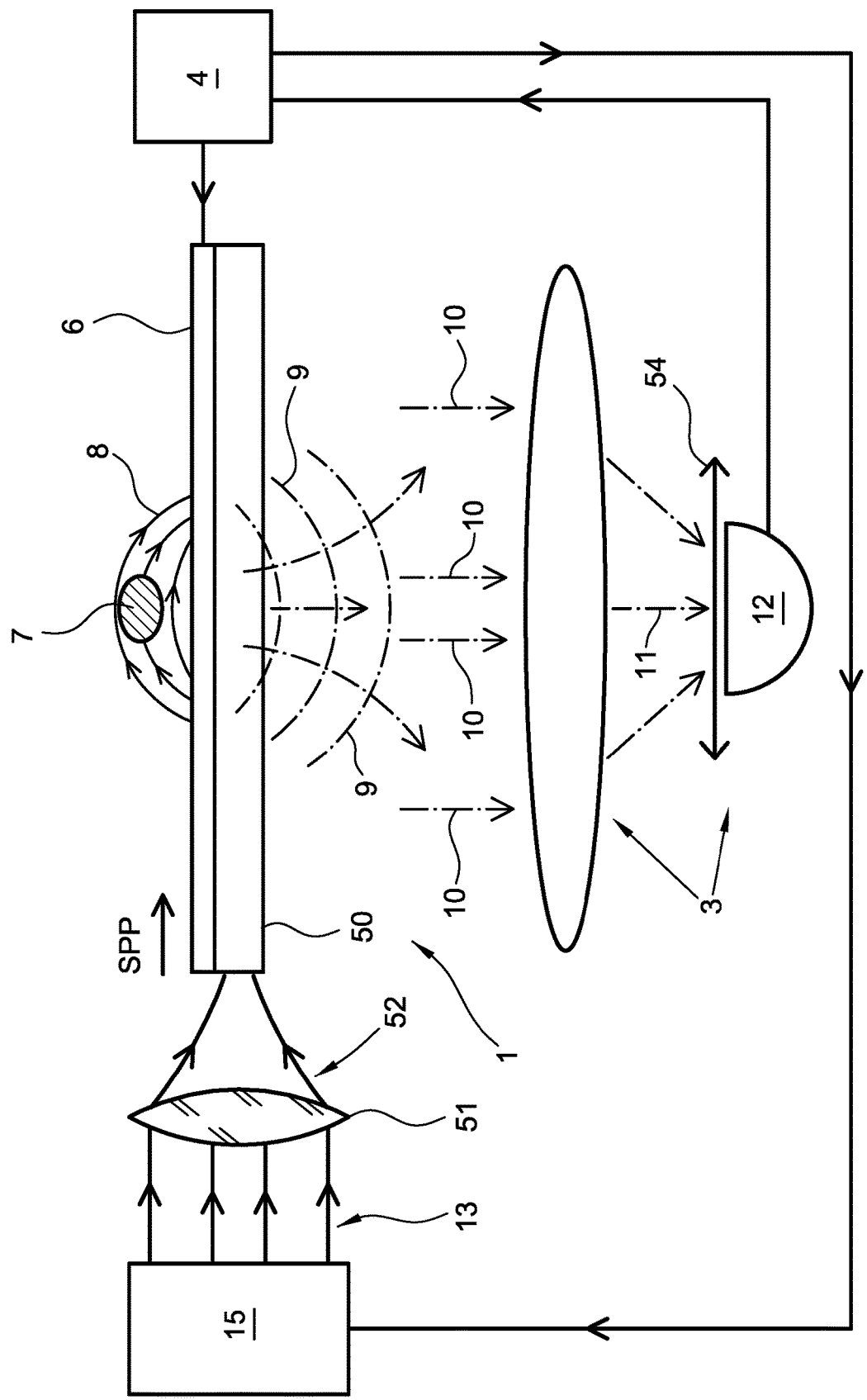
FIG. 11 schematically illustrates an imaging apparatus according to an alternative embodiment of the invention in which surface plasmons (SP) are excited in an array of electronically addressable pixels within the imaging apparatus, by light coupled to one end/side of the array at an edge thereof.
Figure 12:
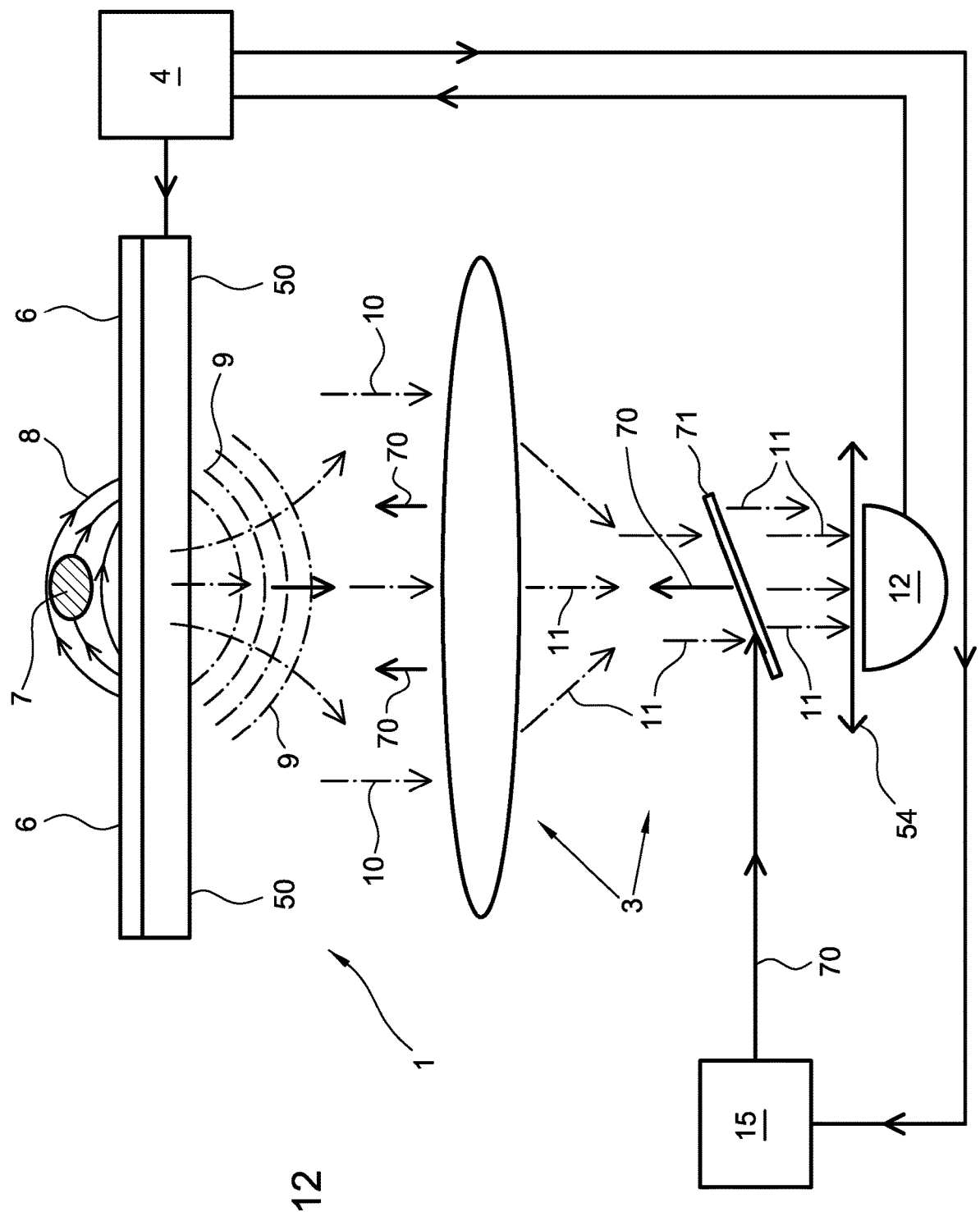
FIG. 12 schematically illustrates an imaging apparatus according to an alternative embodiment of the invention in which surface plasmons (SP) are excited in an array of electronically addressable pixels within the imaging apparatus, by light directed onto the array using the same optical element(s) used to collect scattered light for detecting a sample upon the array.

Alternatively, the method (a) may be employed in any embodiment according to the invention, and further examples of the invention are described as employing this alternative method (a) with reference to FIGS. 1E, 11 and 12.

Referring to the example illustrated in FIG. 1A, reference is made to FIGS. 1B, 1C and 1D, in relation to the pixel addressing method (b) employed therein.

FIG. 1B schematically illustrates the functionality and inter-relationship between the photodetector 12 (or 12A, 12B and 12C collectively) and the processing unit (4) which comprises a mixer unit, a Local Oscillator unit, and band-pass filter, and amplifier unit and a demodulator unit. Upon detection of light from the pixel array, the photodetector 12 is responsive to output an electrical detection signal for input to the processing unit. In the schematic drawing of FIG. 1B, it is assumed that the photodetector is in receipt of two concurrent optical signals which each have an intensity that is modulated to vary repetitively—the first with a repetition frequency of $\omega_1$ Hz and the second with a repetition frequency of $\omega_2$ Hz. Thus, the electrical detection signal therefore also carries this modulation and varies repetitively with a repetition frequency of $\omega_1$ and $\omega_2$ simultaneously. It is to be noted that these repetition frequencies relate to repetition in the modulated intensities of the detected light signals, and they do not refer to the optical frequencies of the light waves conveying the optical signal in question.

The mixer unit of the processing unit has a first input arranged to receive the electrical detection signal from the photodetector (12) and a second input arranged to receive, concurrently, a Local Oscillator signal comprising a sinusoidally varying electrical signal of amplitude $A_{LO}$, and frequency $\omega_{LO}$. The mixer unit is arranged to mix the input electrical detection signal with the local oscillator signal and to output the result to a band-pass filter unit arranged to pass signal components of the mixer output signal corresponding to beat tones of frequency $\omega_B$, generated by the mixer unit, and to block all other signal components—both AC components and DC components.

The amplifier unit is arranged to receive the beat tone signals, to amplify them and to output the result to a demodulator unit which is arranged to determine the amplitude of a received beat tone ($\tilde{M}_j(s)$, see below) of a given frequency (e.g. repetition frequency of $\omega_1$ or $\omega_2$), and a detected amplitude ($A_j$, see below) of the optical signal associated with that beat tone.

It is to be noted that while the mixer unit, local oscillator unit, band-pass filter unit, amplifier unit and demodulator unit may be implemented as hardware items, it is equally possible to implement one, some or each of these units in software arranged to simulate the respective signal processing functionality of the unit in question. Furthermore, the processing unit (4) may comprise an analogue-to-digital converter (not shown) arranged to receive the electrical detection signals from the photodetector unit, arranged to convert the analogue electrical signals received by it from the photodetector unit (12), into digital signals for subsequent signal input to the mixer unit concurrently with the Local Oscillator signal in digital form. Furthermore, the processing unit may be comprise a memory unit (not shown) arranged to store the digital electrical detection signal values for subsequent signal input to the mixer unit concurrently with the Local Oscillator signal in digital form.

The mixer unit is arranged, as mixers in general are, to apply a non-linear function to the combined input signals ($s=s_1+s_2$) to produce a mixer output signal as follows:

$$M(s) = \alpha_1 s + \alpha_2 s^2 + \ldots$$

In the present case, the combination of the input signals to the mixer comprise the Local Oscillator signal:

$$s_1 = A_{LO} \sin(\omega_{LO} t)$$

and the optical detector signal:

$$s_2 = A_0 + \sum_j A_j \sin(\omega_j t)$$

to give:

$$s = A_0 + \sum_j A_j \sin(\omega_j t) + A_{LO} \sin(\omega_{LO} t)$$

This results in a mixer output signal of the form:

$$M(s) = \alpha_1 \left[ A_0 + \sum_j A_j \sin(\omega_j t) + A_{LO} \sin(\omega_{LO} t) \right] + \alpha_2 \left[ A_0 + \sum_j A_j \sin(\omega_j t) + A_{LO} \sin(\omega_{LO} t) \right]^2 + \cdots$$

Given that the individual pixel signal amplitudes, $A_j$, are much smaller than the Local Oscillator amplitude and the DC level, $A_0$, we consider the terms in $\alpha_1$ and $\alpha_2$ alone. This gives:

$$M(s) \approx \alpha_1 [A_0 + \Sigma_j A_j \sin(\omega_j t) A_{LO} \sin(\omega_{LO} t)] + \alpha_2 [A_0^2 + (A_{LO} \sin(\omega_{LO} t))^2 (\Sigma_j A_j \sin(\omega_j t))^2 + 2A_0 (\Sigma_j A_j \sin(\omega_j t) A_{LO} \sin(\omega_{LO} t)) 2A_{LO} \Sigma_j A_j \sin(\omega_j t) \sin(\omega_{LO} t)]$$

Noting that:

$$2A_{LO} \sum_j A_j \sin(\omega_j t) \sin(\omega_{LO} t) = \sum_j 2A_{LO} A_j \{\cos([\omega_j - \omega_{LO}]t) - \cos([\omega_j + \omega_{LO}]t)\}$$

it can be seen that by applying an appropriate band-pass filter to M(s) to exclude all frequencies higher than the frequencies defined by $[\omega_j - \omega_{LO}]$, and to exclude any DC level, we obtain a filtered mixer output signal, $\tilde{M}(s)$, given by:

$$\tilde{M}(s) \approx \sum_j \tilde{M}_j(s) \cos(\omega_B^{(j)} t)$$

The Fourier spectrum of this filtered mixer output signal shows a frequency comb of beat tones at the following beat frequencies:

$$\omega_B^{(j)} = [\omega_j - \omega_{LO}]$$

Each beat tone will have an amplitude given by:

$$\tilde{M}_j(s) = 2A_{LO} A_j$$

From the measured amplitude of a beat tone, $\tilde{M}_j(s)$, given that the Local Oscillator signal amplitude an amplitude, $A_{LO}$, is known, an amplitude, $A_j$, associated exclusively with the received optical signal for pixel number j is determined as:

$$A_j = \frac{1}{2} \tilde{M}_j(s) / A_{LO}$$

For example, as an illustrative but non-limiting example useful for a better understanding of the invention, consider a case in which the Local Oscillator generates a Local Oscillator signal having a frequency of $\omega_{LO} = 1$ kHz, and in which the frequency $\omega_j$ at which a $j^{th}$ pixel of the array of pixel is driven between the 'on' and 'off' states is given by $\omega_j = (1.0 + j*0.01)$ kHz (j=1, 2, 3 . . . ), then beat tones will be present at $\omega_B^{(j)} = j*0.01$ kHz (j=1, 2, 3 . . . ). In this setting, the beat tones are far removed from signal components of the mixer output signal at frequencies of $\omega_j$, or $\omega_j + \omega_{LO} \lesssim 2\omega_{LO}$, or $\omega_{LO}$, or multiples thereof, which are removed from the filtered mixer output signal, M(s).

For example, in the schematic diagram of FIG. 1B, optical signals are received from two separate pixels of the array of pixels, to which a first pixel drive signal was applied to one of the two pixels to cause it to switch between an 'on' state and an 'off' state with a repetition frequency of $\omega_1$ (i.e. j=1), and a second pixel drive signal was applied to the other of the two pixels to cause it to switch between an 'on' state and an 'off' state with a repetition frequency of $\omega_2$ (i.e. j=$^2$).

This results in an output from the band-pass filter of a frequency comb signal comprising two beat tones as follows.

A first beat tone located at frequency $\omega_B^{(j)} = 0.01$ kHz with an amplitude of $\tilde{M}_1(s)$. A second beat tone located at frequency $\omega_B^{(2)} = 0.02$ kHz with an amplitude of $\tilde{M}_2(s)$. These beat tones are input to a signal amplifier for amplification and subsequently are input to a demodulator which determines the respective beat tone amplitudes $A_j$ and $A_2$ as separate output values according to:

$$A_1 = \frac{1}{2} \tilde{M}_1(s) / A_{LO}$$

and $$A_2 = \frac{1}{2} \tilde{M}_2(s) / A_{LO}$$

Each of these two amplitude values is then associated with (e.g. stored in memory in association with, or used as the pixel value or luminance of an associated pixel of a display screen) the respective pixel coordinate value of the specific pixel, within the array of pixels, to which the respective drive signal frequency of $\omega_1$ or $\omega_2$ was applied. A data set representing a map, or image, of the spatial contrast or variation as across the array of pixels, of optical constants (e.g. refractive index) of the illuminated sample upon the array of pixels, may be generated in this way. This is encapsulated in the spatial variation in the measured values of the respective beat tone amplitudes $A_j$. While only two beat tone amplitudes are discussed in this simple example, it is to be understood that the detection technique described herein may be applied to any number (e.g. all) of the pixels of the array. This may be done by simultaneously driving any desired number of pixels of the array (e.g. a subset of pixels, or all pixels). The heterodyne technique described herein permits multichannel/multiplexing signal processing of all simultaneously driven pixels—in brief, the more pixels that are driven simultaneously, the more beat tones will appear in the filtered mixer output signal, $\tilde{M}(s)$.

In alternative signal processing techniques, a "lock-in amplifier" may be employed to multiply (e.g. convolve) the pixel drive signal which was used to modulate (electro-thermally) a particular addressed pixel of the pixel array, with the optical detection signal generated by the optical detector in response to detected light. As will be readily known to the skilled persons in the art, a "lock-in amplifier" multiplies an "input" signal with a "reference" signal in order to extract a signal with a known carrier wave (i.e. a modulation associated with a particular addressed pixel, in this case). It may be considered to be a homodyne detector followed by low-pass filter. That is to say, a pixel drive signal (e.g. a sinus or square wave) may be used as the "reference" signal in the "lock-in amplifier", and the optical detection signal may be used as the "input" signal in the "lock-in amplifier". The convolving applied by the "lock-in amplifier" convolves the multiplied signals over a specified time period, e.g. a few milliseconds to a few seconds. The resulting convolution signal is a DC signal, where the contribution from any signal that is not at the same frequency as the "reference" signal is highly attenuated (e.g. to ~zero value). If the pixel drive signal (modulation current) and the optical detector signal share the same frequency, then the result of this multiplication/convolution is to generate (after low/long-pass filtering) a DC value which is equivalent to the changes in the optical contribution from the particular pixel. By multiplying (convolution) the optically detected/received data with a signal applied to any given pixel (and thus different respective pixel drive frequency) one can extract its contribution in this way. Since the driving currents applied to individual pixels are known, this alternative procedure can be applied numerically to a digital data stream generated after digitisation (A/D-conversion) of the signals involved. This is economical and fast.

Figure 10:
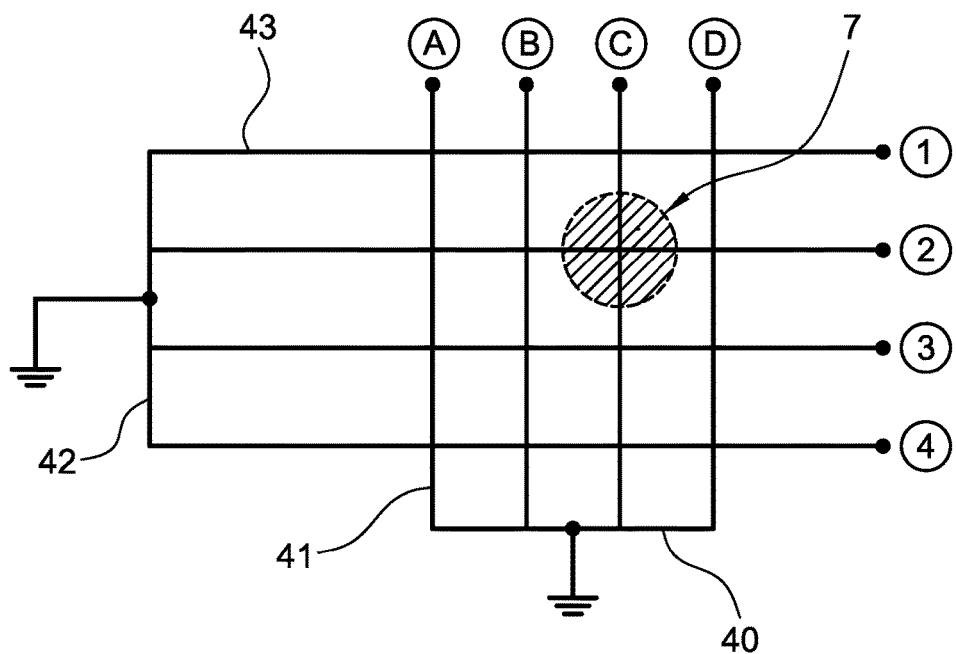

The processing unit (4) is arranged to generate electronic pixel drive signals for application to individual pixels of the array of pixels. FIG. 10 schematically illustrates an example of an electronic pixel drive signal applied to a predetermined and specified pixel of the array of pixels, located within the array of pixels at a predetermined and specified pixel address (e.g. row and column coordinates, when the pixel array is ordered as a Cartesian array). The drive signal comprises a regularly repeating sequence of electrical drive pulses forming a square-wave pulse train having a repetition frequency of some specified and selected value $\omega_{Drive}$ When a pulse of the pulse train is applied to a selected pixel of the array of pixels, that pixel is responsive to change from an 'off' state to an 'on' state (or vice versa, as discussed below). When in a 'off' state, the pixel does not support a surface plasmon resonance which might otherwise be excitable by the light (30) from the light source (15) bathing the underside of the pixel array. However, when the pixel is in an 'off' state it does support a surface plasmon resonance excitable by the light (30) from the light source (15) bathing the underside of the pixel array.

In this way, while bathed in light from the light source, a pixel of the pixel array which is addressed by a pixel drive signal pulse train, will repetitively switch 'on' and 'off' to repetitively generate a surface plasmon at that pixel which may interact with a sample disposed at or over the pixel in question. The optical effects of such an interaction may be any one, some or each of the following effects:

(1) Optical radiation may be scattered from the evanescent field of the surface plasmon resonance by the sample. This scattered radiation is detected by the photodetector. This scattered light passes through the plane of the pixel array to the opposite side of the pixel array where it is gathered by the detector(s). The pixel array may be made from a transparent conductor (e.g. ITO) and/or may be structured with gaps/openings between pixels to allow light to pass through the plane of the pixel array.

(2) Optical radiation is generated by the sample by a process of luminescence or fluorescence excited by the evanescent field of the surface plasmon resonance within atoms/molecules (e.g. dye molecules) within the sample. This luminescence or fluorescence light passes through the plane of the pixel array to the opposite side of the pixel array where it is gathered by the detector(s). The pixel array may be made from a transparent conductor (e.g. ITO) and/or may be structured with gaps/openings between pixels to allow light to pass through the plane of the pixel array.

(3) Changes in the optical reflectivity of the illuminated side of the pixel array (e.g. the internal side of a transparent surface upon which the array is disposed, as the case may be) causing changes in the quantity of reflected light from the light source. The detection of reflected light may be achieved in the example of FIG. 1A, in which reflected light (13) may be totally internally reflected at the lower internal surface of a planar optical waveguide (50) against which a photodetector (12A,12B,12C) is situated, by virtue of the fact that the evanescent field of the guided light (13) when reflecting from that lower internal surface, will extend through the surface to interact with the photosensitive parts of the photodetector thereby allowing a proportion of the reflected light to be detected by the photodetector. In a sense, the optical waveguide is rendered somewhat 'leaky' at that surface to an extent sufficient to enable detection of a proportion of (e.g. merely a small proportion of) the reflected light. Changes in the size of that small proportion may be modulated by the modulating pixel drive signal applied to the pixels of the pixel array. The modulated pixels thereby modulate the quantity of light reflected in the optical waveguide internally at the upper internal surface of the waveguide adjacent to the driven pixel array Each of these optical effects may be modulated by modulating surface plasmons at a chosen pixel or pixels of the array of pixels according to the pulse train of the drive signal. For example, referring to FIG. 1D, consider an illustrative example in which just two pixels of the array of pixels are driven by a respective drive signal pulse train such as is illustrated in FIG. 1C, whereby a first pixel at a first predetermined pixel coordinate, within the array of pixels, is driven at a first drive signal frequency of $\omega_{Drive}=\omega_1$, and a second pixel at a second predetermined pixel coordinate, within the array of pixels, is driven at a second drive signal frequency of $\omega_{Drive}=\omega_2$. The optical effect of the driving of the first pixel will be any one, two or all of the optical effects (1), (2) and (3) listed above, and this will generate a modulated optical signal (modulation frequency $\omega_1$) emanating from the driven first pixel for detection the photodetector (12) in in the form shown in FIG. 1D. At the same time, the optical effect of the driving of the second pixel will be any one, two or all of the optical effects (1), (2) and (3) listed above, and this will also generate a modulated optical signal (modulation frequency $\omega_2$) emanating from the driven second pixel for detection the photodetector (12) in in the form shown in FIG. 1D.

The actual form of the detected signal generated by the photodetector will take the form of the combination of these two modulated signals as shown in FIG. 1D (solid curve). It is this detected signal to which the heterodyne signal processing described above (FIG. 1B) is applied to extract from it the respective amplitudes of the individual modulations generated by the individual first and second pixels. Of course, all of the pixels of the pixel array may be driven in this way by a drive pulse train having a unique pulse repetition rate amongst all of the drive signals. The frequency at which the individual optical modulations appear in the detected signal, is unique to the pixel that generated it, and so the detected amplitude of that modulation can be associated with the specific location of the originating driven pixel within the pixel array (6). A map or picture of the detected amplitudes of these optical modulations may thereby be formed to map or image optical constants (e.g. refractive index) of the sample upon the array.

The apparatus may form a sensor arranged to analyse (with sub-diffraction limited resolution) variations in the refractive index (e.g. complex optical constants) of a sample placed in immediate adjacency, or in direct contact, with the pixel array. The sensor may be used in a mobile application. Because of the high spatial resolution of this sensor, it is capable of detecting pathogens (e.g. bacteria, viruses, DNA/RNA strands, proteins etc.) e.g. in fluid droplets, deposited on its upper surface, or small structures (e.g. a fingertip), placed against it. The apparatus may provide a very small and compact device.

Figure 13:
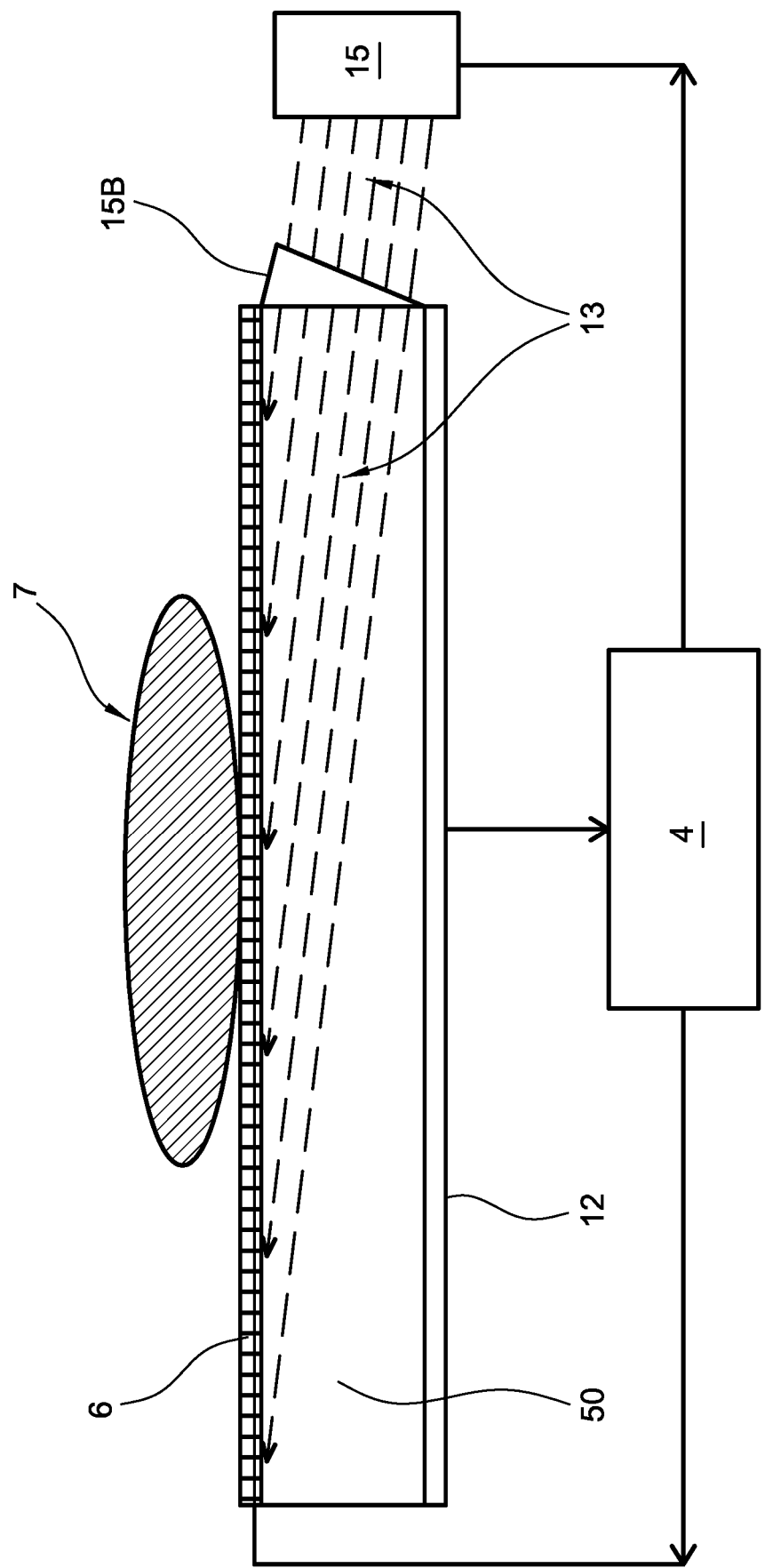
FIG. 13 schematically illustrates an imaging apparatus according to an embodiment of the invention, which is similar to the arrangement of FIG. 1A, but employs an alternative pixel illumination arrangement resulting in a more grazing angle of incidence of excitation light illuminating the array of pixels.

The transparent light-guide support substrate (50) is illuminated from its edge with excitation light, either through multiple total reflections (as demonstrated in FIG. 1A) or at a grazing angle of incidence with respect to the substrate (as illustrated in FIG. 13), and the conducting (e.g. metallic) addressable pixel array disposed upon it. The purpose of the excitation light is to excite surface plasmon-polaritons (SPP) on the conducting pixel array (nanostructured array, 6). FIG. 13 schematically illustrates an imaging apparatus according to an embodiment of the invention, which is similar to the arrangement of FIG. 1A, but employs an alternative pixel illumination arrangement simply resulting in a more grazing angle of incidence of excitation light illuminating the array of pixels.

Optionally, the coupling efficiency of excitation light into the transparent substrate can be improved via usage of a coupling prism (15B of FIG. 1A; 15C of FIG. 13). The pixel elements of the conducting (e.g. metallic) pixel array (nanostructured array, 6) can be tuned in and out of surface plasmon-polariton resonance (modulated) by changing the temperature of individually addressed pixels of the array (i.e. via Joule heating), selectively and addressably. This heating alters the evanescent electric field "above" the pixel element where it extends saliently from a first side of the pixel array.

The frequency of modulation of the drive signal applied to the addressed pixel can be used subsequently to locate the addressed pixel and hence to map the different contributions of the sample in the detected optical signal from the array. As mentioned above, the signal is detected by a layer of one or more light-sensitive optical detectors (12A-12C) at the "bottom" surface of the sensor, adjacent a second side of the pixel array opposite to the first side. The sensors are arranged to detect light which has been subject to any of the three optical effects (1) to (3) described above. The detector(s) may comprise photodiodes, for example. As the spatial mapping is done via the frequency of the pixel drive signal modulation, either one large photodiode or several photodiodes can be used to cover the area and to facilitate the detection.

An optional thin transparent protective layer (6B) may cover the addressable pixel array (6) of the sensor, in order to protect the pixel array and to protect the sample from potential denaturation. It also facilitates an easier cleaning of the sensor for quick successive testing of different samples. Suitable materials for the thin transparent protective layer (6B) include (but are not limited to) transparent sheets of SiN, or $SiO_2$. The thin transparent protective layer may have a uniform thickness in the range of: about 5 nm to about 40 nm.

Referring to FIG. 1E, there is shown schematically, an example of an imaging apparatus (1) for imaging a sample (7), such as a biological sample. The imaging apparatus includes a Kretschmann-type prism (2) comprising an optical prism block (5) upon one planar surface of which is formed a planar array (6) of electronically addressable pixels. Each pixel of the array is arranged to support a surface plasmon upon its surface, and in doing so generate an evanescent electromagnetic field (8) which extends transversely from the pixel so as to be salient, or standing proud, from the plane of the array of pixels.

A light source (15), such as a laser or a light-emitting diode (LED), is arranged to direct optical radiation (13) into the optical prism block (5) towards the underside of the array (6) of pixels at the interface between the array and the surface of the optical prism block supporting it. Specular reflection occurs at the interface resulting in deflection of the incident optical radiation at an angle ($\theta$) of reflection matching the angle of incidence, measured relative to the direction normal/perpendicular to the reflecting surface. The reflected radiation (14) is directed towards, and collected by, a resonance detector unit (16) which detects the intensity of reflected radiation emanating from the reflecting surface.

The light source (15) is arranged so that it uniformly illuminates the entire back surface of the pixel array (6). For example, the light emitted by the light source is collimated by an optical system such as a condenser system (e.g. collimating lens or lenses), such as used in existing 'brightfield' microscope systems. Of course, the condenser system when applied to the present embodiment, is arranged to direct the collimated optical radiation (13) at an oblique angle of incidence and, therefore, the optical axis of the condenser system is tilted relative to the underside of the array (6) of pixels. If a high-quality laser is used as the light source, then it may typically provide a light output sufficiently collimated without the need for additional collimation. The area of the underside of the prism block surface which is illuminated in this way may typically be significantly smaller than the entire prism back surface area.

It is to be understood that the resonance detector unit (16) is present in the embodiment described here as a preferred feature, but may be dispensed with in other embodiments (discussed below). For example, in the present embodiment, if the resonance angle of incidence of optical radiation upon the pixel array required to resonantly excite surface plasmons (SP) is already known, then the light source (15) may be fixed at this angular position within the structure of the apparatus in use, or during manufacture. However, in the present embodiment of the invention as illustrated in FIG. 1E, the resonance detector unit (16) is present for detecting the resonance angle to allow optimisation of that angle and, therefore of the degree of coupling to SPPs. The resonance angle detector (16) helps to find the best angle for optimisation, as the optimum angle depends not only upon the refractive indices of the prism block and pixel array materials, respectively, but also depends to some extent upon the mean/average refractive index of the sample. The angular position of the light source (15) is shared by the angular position of the light source (15), by specular reflection symmetry. Alternatively, one could seek the angular position of the resonance angle detector (16) at which the maximum optical emission (10) from the sample takes place, in order to optimise the configuration of the system, and such a configuration would include the ability to change the angular position of the light source relative to the pixel array, but would not require the use of the reflectivity detector (16). However, it has been found that using the value of reflectivity, via the reflectivity detector (16) is the easier (high contrast) choice.

Figure 2:
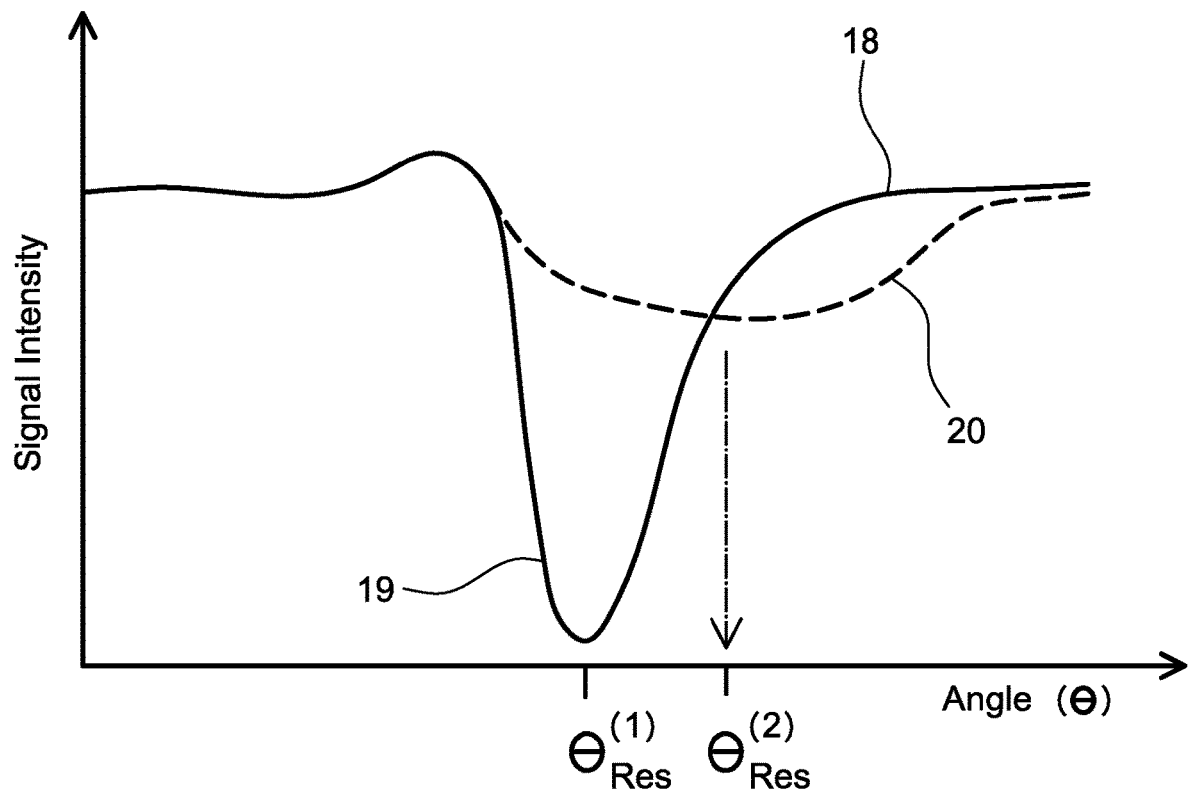
FIG. 2 schematically illustrates resonance profiles in a reflected optical signal intensity (the reflectivity or reflected intensity) as a function of the angle of incidence of optical radiation in the imaging apparatus of FIG. 1A, 1E, 11 or 12.

The following details relating to the control of the generation of a surface plasmon resonance at a pixel of a pixel array of the invention, by temperature control, is applicable to all embodiments of the invention including those described with reference to FIG. 1A or FIG. 1E or FIG. 11 or FIG. 12, or FIG. 13. A resonance occurs in the intensity of reflected optical radiation (14) when the angle of incidence/reflection ($\theta$) acquires a value at which the component of the wave vector of incident light (13) parallel to the plane of the pixel array (6), matches the value of the wave vector of surface plasmons excitable in the pixels of the pixel array. The pixel array may be formed of any metal, however silver or gold are preferred (in the visible part of the optical spectrum) aluminium or magnesium in the UV. The incoming light excites (couples to) surface plasmons which generate a traveling evanescent electrical field (the surface plasmon) at the conducting (e.g. metallic) surface of the pixel in question. This strong coupling results in a dramatic reduction (19) in the intensity of reflected optical radiation which is schematically illustrated in FIG. 2. The dramatic drop in reflected intensity occurs at a resonance angle $\theta_{Res}^{(1)}$, and is of relatively narrow width such that deviation from the resonance angle causes the reflected optical intensity to quickly resume a non-resonant value (18).

The inventors have discovered that the depth, width and position of this resonance is a variable by varying the temperature of the pixel within which the surface plasmon resonance occurs. This is schematically illustrated in FIG. 2 whereby the sharp and deep resonance profile (19) centred at a resonance angle, $\theta_{res}^{(1)}$, occurs at a first pixel temperature ($T_1$). However, a different resonance profile (20) is produced, which is broader and shallower, when the temperature of the pixel is raised to a second pixel temperature ($T_2$) which exceeds the first pixel temperature. This is believed to be due to thermal excitation of the electrons forming the surface plasmon. The angular position of the second resonance profile angle, $\theta_{res}^{(2)}$, is significantly different to (larger than) that of the first resonance profile (19). As will be explained in more detail below, this property is exploited to enable individual pixels of the array to be addressed electronically.

In principle one may provide the apparatus of FIG. 1E (or FIG. 1A or FIG. 1E or FIG. 11 or FIG. 12, or FIG. 13) arranged in one of two arrangements. In a first arrangement, the light source (15) may be disposed so that the angle of incidence of illuminating optical radiation (13) is substantially coincident with the resonance angle, $\theta_{res}^{(1)}$. In a second arrangement, the light source (15) may be disposed so that the angle of incidence of illuminating optical radiation (13) is substantially coincident with the angular position of the second resonance profile angle, $\theta_{res}^{(2)}$. In the first arrangement, as defined above, the system (pixel) is in resonance ("on" state) at temperature $T_1$. Raising its temperature to $T_2$ reduces or removes the resonance condition and the pixel will be in an "off" state. When the pixel is not so heated, or cools, it resonantly couples to incident light and is in the "on" state again. In the second arrangement, when the pixel is not actively heated and has a temperature $T_1$, the pixel is in an "off" state. By actively heating the pixel, it is made resonant and is rendered in the "on" state. The first arrangement is preferred due to the sharp and deep resonance profile (19) which permits a higher degree of contrast in SPP coupling strengths between the pixel "on" and "off" states, as compared to the second arrangement.

The evanescent electromagnetic field (8) extends a sufficient distance from the array of pixels to illuminate the biological sample (7). The interaction of the evanescent electromagnetic field (8) with the biological sample causes optical (9) radiation to scatter from the sample. In alternative embodiments, the interaction of the evanescent electromagnetic field (8) with the biological sample may excite fluorophores placed/labelled within the sample. It is not necessary to label samples with fluorophores, but labelling enhances image contrast and is therefore of interest as an alternative. At a distance from the array of pixels (6), some of the scattered optical radiation (10) is gathered by an optical detector comprising an objective lens (3) and an optical detector unit (12). Scattered optical radiation (11) collected by the objective lens (3) is focused upon the light-sensitive elements of the optical detector unit (12) which is responsive to the focused light to generate an electrical signal for input to a processing unit (4). It is to be understood that the objective lens (3) is presently illustrated as a single lens element for simplicity. However, other embodiments of the invention may employ optical trains comprising more than one lens element and may employ reflecting optical elements, as desired to appropriately direct light and/or to appropriately manipulate light for detection.

The processing unit (4) is arranged to selectively electronically address individual pixels, or groups of pixels, of the array of electronically addressable pixels (6) so as to cause the addressed pixels to generate (or annihilate) surface plasmons therein, and associated salient evanescent electromagnetic fields (8). The processing unit (4) is also arranged to await a consequential electrical signal input from the optical detector unit (12) generated in response to having optically illuminated one or more of the pixels of the pixel array (6).

The processing unit is arranged to associate the received electrical signal, which is generated in response to detection of an optical signal emanating from the pixel array (6), with the array address of the pixel or pixels that had been addressed by the processing unit (4). Because the precise location and position upon the pixel array of each addressed pixel is known, therefore the position of the sample (7) responsible for the scattering of light (9, 10, 11) subsequently received by the optical detector unit (12), is also known, by direct association. As a result, the resolution achievable by the imaging apparatus (1) is limited only by the physical size of individual pixels (and their evanescent electromagnetic field) addressable within the pixel array (6). If the sample extends across a group of multiple pixels, then the shape of the group of pixels will follow the corresponding shape of the sample projected onto the plane of the pixel array. Consequently, by addressing a succession of pixels of the pixel array, one after the other, across the array, the processing unit (4) of the apparatus is able to build up a "picture" of the projected shape of the sample on a pixel-by-pixel basis. This method does not require the use of repetitive drive signal pulses or heterodyne or 'lock-in amplifier' detection techniques, such as are employed in the example of FIG. 1A or FIG. 13, however such techniques can be applied to the embodiment of FIG. 1E (or FIG. 11 or FIG. 12) as desired.

It is also possible that different amounts of light may be scattered by different parts of a sample which are adjacent different pixels in the group of pixels, so that the different intensities of the light signal detected by the optical detector unit (12) gives a picture of a property of the sample. For example, less dense regions of a sample scatter less light than more dense regions, meaning that the detected intensity pixel map may be a measure of optical density variation in the sample. The angular position of the reflectivity detector (16), and concurrently the same angle of the light source (15) by specular reflection symmetry, may be varied and corresponding variations in the intensity of light may be concurrently detected by the optical detector unit (12), in order to measure the spatially distributed local refractive index n within the sample. This is because the precise angular position of the light source, at which resonant SPP coupling occurs, is dependent upon the mean/average refractive index of the sample. Maximum SPP coupling will occur at the particular resonance angle of incidence corresponding to a local region of the sample possessing the necessary refractive index associated with that resonance angle. As a result, that local region will be seen as brighter, by the optical detector unit (12), as compared to other local regions of the sample not sharing the same refractive index. Those other local regions will be seen as brighter, by the optical detector unit (12), when the angular position of the reflectivity detector (16) is changed to correspond with the resonant angle of incidence associated with the refractive index of that other region. Thus, scanning through a range of angular positions of the light source (15) and concurrently the same angle of the light source (15) by specular reflection symmetry, one may scan the spatial distribution of refractive index variation within the material of the sample.

Figure 3:
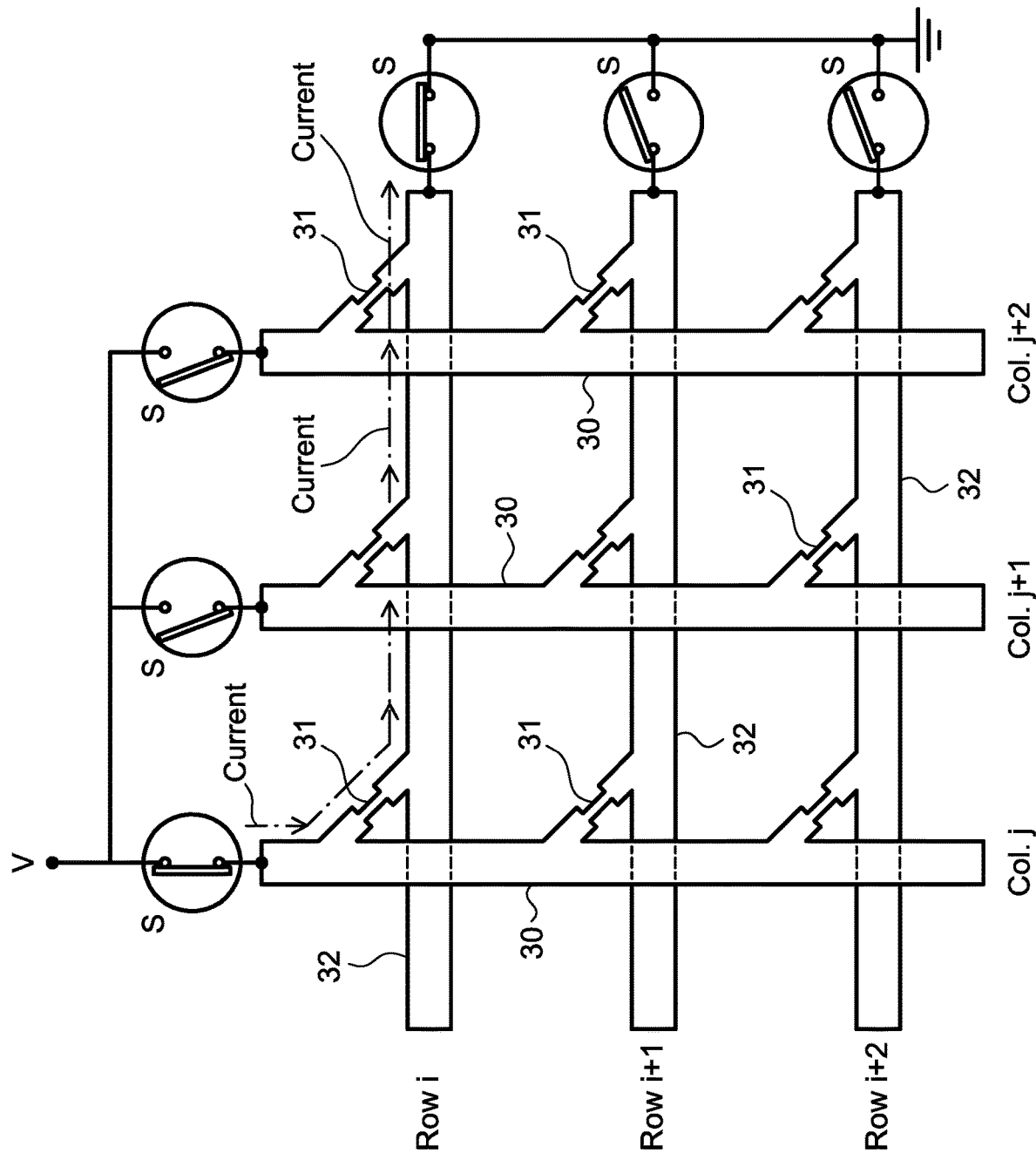
FIG. 3 schematically illustrates an array of electronically addressable pixels within the imaging apparatus of FIG. 1A, 1E, 11 or 12.

FIG. 3 schematically illustrates an example of the array (6) of electronically addressable pixels of the apparatus of FIG. 1A or FIG. 1E (or FIG. 11 or FIG. 12, or FIG. 13). The array comprises a plurality of parallel first conductive lines (30) comprising any suitable metal, preferably gold or silver, each defining an addressing column (col.[j]; col.[j+1]; col.[j−2], etc.) of the pixel array. The array also comprises a plurality of parallel second conductive lines (32) passing transversely across the first conductive lines (30). The second conductive lines comprise any suitable metal, preferably gold or silver, and each defines an addressing row (row[i]; row[i+1]; row[i+2], etc.) of the pixel array.

A plurality of pixels (31) are formed at regular intervals along each of the first conductive lines. Each pixel forms a conductive bridge between a given first conductive line and a given second conductive line to permit a flow of current between the given first conductive line and the given second conductive line via the pixel. A given first conductive line is electrically connected (directly, and physically) to a given second conducting line only via the pixel conductive bridges along the line. An electrical insulating material separates each of the first conductive lines from each of the second conductive lines where they overlap, to prevent electrical connection there. This means that for a current to flow from a given first conductive line and a given second conductive line, it must flow via a pixel joining the two conductive lines in question. At an end of each conductive line, the line in question is connected to a predetermined electrical potential or voltage via a switch unit 'S', which is operable to electrically isolate the given conductive line from the predetermined potential/voltage when in the 'open' state, and to electrically connect the given conductive line to the predetermined potential/voltage when in the 'closed' state. Each of the switching units is controlled by the control unit (4) to change between an 'open' state and a 'closed' in order to address a selected pixel, as will be explained below.

The pixels (31) each consist simply of a narrowing of the cross-sectional area of the conductive line over a distance along the conductive line corresponding to the dimension of the pixel in that direction. The narrowing of cross-sectional area is achieved by narrowing the conductive track in two of its three dimensions: namely in a first dimension transverse to the conductive track but lying within the plane of the pixel array; and concurrently in a second dimension perpendicular to both the conductive track and the plane pixel array. The transverse direction of the pixel simply the width of the conductive line in question.

Figure 4:
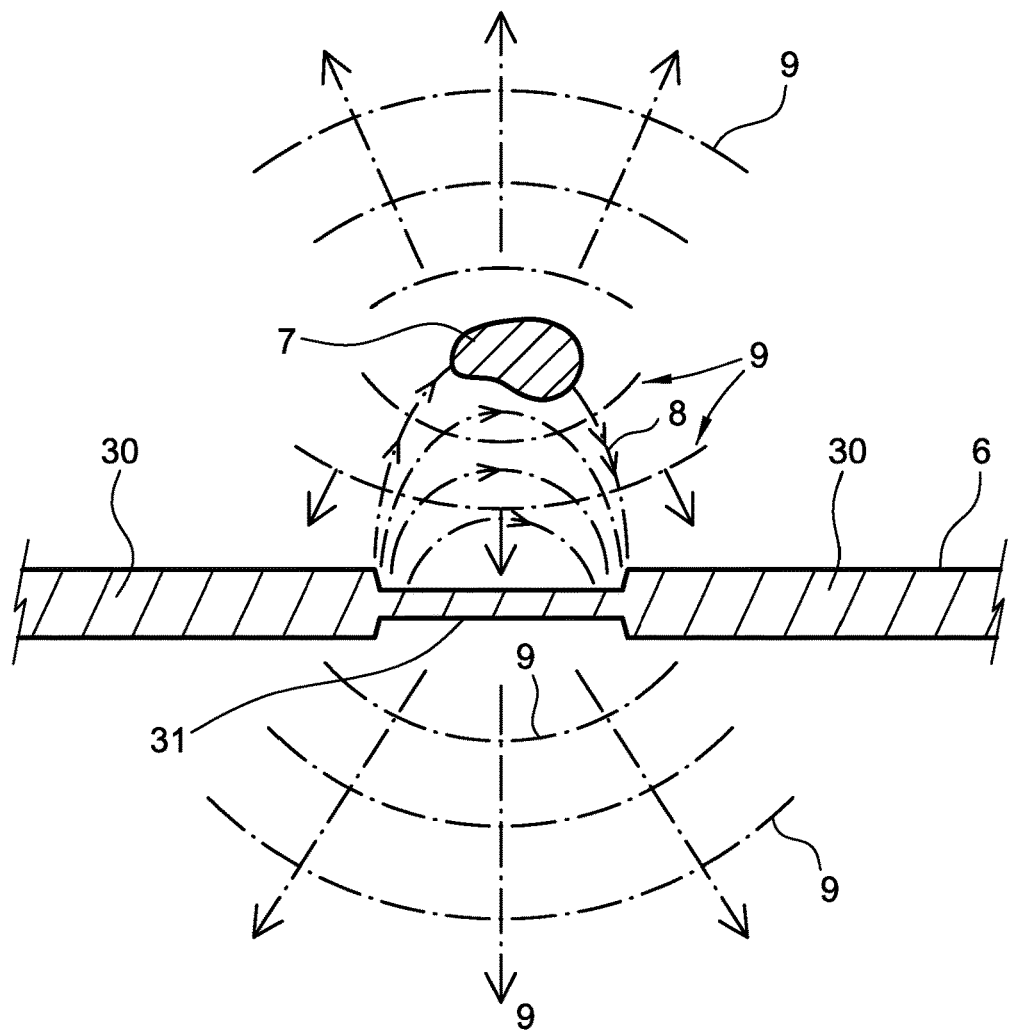
FIG. 4 schematically illustrates an evanescent electromagnetic field generated by surface plasmon resonances supported by an electronically addressable pixel within the array illustrated in FIG. 3.

FIG. 4 illustrates, schematically, the cross-sectional view of a conductive line (30) illustrated a narrowing of the thickness of the conductive line at a pixel (31) in the second dimension perpendicular to the plane of the pixel array, and the conductive line (30) in question. This figure also schematically illustrates the evanescent electromagnetic field (8) supported by the surface plasmon generated in the pixel, which illuminates a sample (7) allowing the sample to scatter (or fluorescently generate) optical radiation (9) collectable by the objective lens (3) of FIG. 1E (or directly detectable by the photosensor of FIG. 1A or FIG. 13), as described above.

An individual pixel (31) may be addressed within this array, by applying an electrical potential (e.g. voltage 'V') to an end of any one of the first conductive lines (30), while concurrently applying an electrical potential (e.g. V=Ground) to an end of any one of the second conductive lines (32). This is schematically illustrated in FIG. 3 by the connection of a first conductive track representing column of the array, to an electrical voltage 'V' by operation of a switch 'S' connecting an end of the conductive line to an electrical contact held at voltage level 'V'. Concurrently, an end of a second conductive track representing row 'i' of the array, is connected to a 'Grounded' electrical potential by operation of a switch 'S' connecting an end of the second conductive line to an electrical contact held at the Ground level. As a result of these connections, a current path is formed which permits a flow of electrical current between the closed switch of column and the closed switch of row 'I', via the pixel element (31) which bridges row 'I' and column 'j'. Consequently, the pixel at array address (i,j) is addressed. The flow of current through the pixel causes the pixel to be ohmically heated (a.k.a. Joule heating) with the consequential change in surface plasmon resonance properties induced.

Due to the narrowing of the dimensions of the conductive track at the location of the pixel, current conducted through the pixel has a higher current density than in other parts of the conductive track thereby causing a heating of the conductive track locally at the pixel through which current is caused to flow. However, when conditions are controlled such that no electrical current flows through the pixel, then the temperature of the pixel falls. Referring again to FIG. 2, when a current is caused to flow through a pixel, and the pixel is consequentially heated, the resonance profile is represented by the broad and shallow profile (20) illustrated in FIG. 2. Conversely, when current is prevented from flowing through the pixel, and the pixel is consequentially allowed to cool, the resonance profile associated with the cooler pixel is represented by the narrower and deeper resonance profile (19) illustrated in FIG. 2.

The switches 'S' connecting all other rows and columns of the array (i.e. other than row 'i' and column are not operated and are left open such that the potential difference between the ends of such rows and columns, is substantially zero and, therefore, a flow of electrical current between such ends is inhibited. When the two electrical potentials are substantially the same, then substantially no potential difference (voltage) is generated across the addressed pixel, thereby inhibiting or preventing a flow of current through the pixel. Conversely, when the 2 applied electrical potentials differ, then a voltage is generated across the pixel thereby permitting a flow of current through the pixel.

Thus, a pixel of the pixel array is addressed by the processing unit (4) of the apparatus of FIG. 1A or FIG. 1E (or FIG. 11 or FIG. 12 or FIG. 13), so as to be switched "on" to generate the salient evanescent electromagnetic field (8), when electrical current is prevented from flowing through the addressed pixel which is thereby permitted to cool and achieve a strong resonance profile (19). The processing unit (4) is arranged, in use of the apparatus (1), to maintain all of the non-addressed pixels of the pixel array (6) in an "off" state in which current is permitted to flow through them thereby to maintain them in a relatively heated state associated with the shallow and broad resonance profile (20) of FIG. 2.

The condition that a pixel is in the "on" when no current flows, but in the "off" state when current is caused to flow, results from the initially chosen resonance angular position of incident optical radiation. In this example, the optical radiation (13) angle of incidence is chosen to be resonant when no current flows (profile 19 of FIG. 2). The pixels are "on" when there is no current/heating but "off" when there is current/heating. Alternatively, if one chooses the incoming angle of optical radiation (13) to be resonant when current does flow (profile 20 of FIG. 2), then the pixels are "on" when current/heating flows but "off" when current does not flow.

In the present embodiment, in the "off" state, when a pixel is heated, the resonance angle of the associated resonance profile (20) is at a different angular position. However, the angle of incidence of optical radiation (13) employed to illuminate the pixel array (6) is fixed in the apparatus of FIG. 1A or FIG. 1E (or FIG. 11 or FIG. 12 or FIG. 13), and so a surface plasmon resonance is not achieved when the pixel is heated. Consequently, the evanescent field of the surface plasmon, being non-resonant, is very much smaller and less pronounced than it would be when the pixel is switched "on". This diminished evanescent field is ineffective in extending out from the pixel towards the sample (7) which, as a result, is not bathed by a strong evanescent field (8) and cannot efficiently scatter optical radiation (9) towards the objective lens (3) of the optical detector unit of the apparatus.

Reference is now made to FIG. 5 which schematically illustrates a part of an array of electronically addressable pixels within the imaging apparatus of FIG. 1A or FIG. 1E (or FIG. 11 or FIG. 12 or FIG. 13), according to an alternative embodiment. The array of pixels comprises a plurality of structurally substantially identical sub-arrays (80, 81, etc.) each of which comprises a plurality of conductive tracks (30) extending from a common single conductive line (32). Each conductive track (30) contains a section of track length which is constricted in its width and/or constricted in its thickness (31) thereby defining a pixel. Each of the conductive tracks (30) extends laterally from the conductive line (32) of the sub-array.

A first plurality of conductive tracks of the sub-array are arranged to extend laterally from one common side of a conductive line (32) in parallel and separated, neighbour-to-neighbour, by a common spacing thereby to define a first regular, linear column of pixels (31) mutually in register and adjacent to one side of the conductive line (32) they share. A second plurality of conductive tracks of the sub-array are arranged to extend laterally in common, from the other side of a conductive line (32) in parallel and separated, neighbour-to-neighbour, by a common spacing. These conductive tracks also define a second regular, linear column of pixels (31), also mutually in register and adjacent to the other side of the conductive line (32) they share with the first column of pixels. Each conductive track defining a pixel of the first column of pixels is arranged laterally in register with a pixel of the second column of pixels. This defines a part of a regular linear row of pixels. A second sub-array (81) of pixels of the plurality of sub-arrays, is arranged laterally in register with the first sub-array (80) of pixels of the plurality of sub-arrays. The second sub-array is structurally substantially identical to the first sub-array and is spaced therefrom by a spacing which separates the first column of pixels of the second sub-array from the second column of pixels of the first sub-array by a uniform spacing matching the separation between the first and second columns of each sub-array. This enables the pixels of each row of the second sub-array to cooperate with the pixels of the corresponding row of the first sub-array so as to provide a regular spacing between the pixels of the row they collectively define.

The conductive tracks (31) and lines (32) may be formed from gold, silver or other suitably conductive material, Since the tracks of a given sub-array of pixels are in electrical communication with the conductive line (32) of the sub-array, an individual pixel (31) may be addressed within this array by applying an electrical potential ($V_1$) to a terminal end of the conductive line (32) and concurrently applying an electrical potential ($V_{ij}$) to a terminal end of the conductive track (30) corresponding to the "$i^{th}$" row and the "$j^{th}$" column of the sub-array within which the pixel resides. When the two electrical potentials are substantially the same ($V_{ij}=V_1$) then substantially no potential difference (voltage) is generated across the addressed pixel, thereby inhibiting or preventing a flow of current through the pixel. Conversely, when the two applied electrical potentials differ ($V_{ij}>V_1$ or $V_{ij}<V_1$), then a voltage is generated across the pixel thereby permitting a flow of current through the pixel. As a result, pixel position (i, j) is addressed.

In particular, in the example shown in FIG. 5, with voltage $V_1$ applied to the common conductive line (32) or the first sub-array, voltages $V_{ij}$ are applied to the following pixel positions (row, column) of the first sub-array (80):

(1, 1)=$V_{11}$; (1, 2)=$V_{12}$
(2, 1)=$V_{21}$; (2, 2)=$V_{22}$
(3, 1)=$V_{31}$; (3, 2)=$V_{32}$
(4, 1)=$V_{41}$; (4, 2)=$V_{42}$
(5, 1)=$V_{51}$ (5, 2)=$V_{52}$
Etc . . .

Similarly, with voltage $V_1$ applied to the common conductive line (32) or the second sub-array voltages $V_{ij}$ are applied to the following pixel positions (row, column) of the second sub-array (80):

(1, 3)=$V_{13}$; (1, 4)=$V_{14}$
(2, 3)=$V_{23}$; (2, 4)=$V_{24}$ (3, 3)=$V_{33}$; (3, 4)=$V_{34}$
(4, 3)=$V_{43}$; (4, 4)=$V_{44}$
(5, 3)=$V_{53}$; (5, 4)=$V_{54}$
Etc . . .

Voltages $V_{ij}$ are applied to the pixels (row, column) of subsequent sub-arrays (not shown) of the pixel array, with voltage $V_1$ applied to the common conductive line (32) or that sub-array.

Due to the narrowing of the dimensions of the conductive track at the location of the pixel, current conducted through the pixel has a higher current density than in other parts of the conductive track thereby causing a heating of the conductive track locally at the pixel through which current is caused to flow. However, when conditions are controlled such that no electrical current flows through the pixel, then the temperature of the pixel falls. Referring again to FIG. 2, when a current is caused to flow through a pixel, and the pixel is consequentially heated, the resonance profile is represented by the broad and shallow profile (20) illustrated in FIG. 2. Conversely, when current is prevented from flowing through the pixel, and the pixel is consequentially allowed to cool, the resonance profile associated with the cooler pixel is represented by the narrower and deeper resonance profile (19) illustrated in FIG. 2.

Thus, a pixel of the pixel array is addressed by the processing unit (4) of the apparatus of FIG. 1A or FIG. 1E (or FIG. 11 or FIG. 12 or FIG. 13), so as to be switched "on" to generate the salient evanescent electromagnetic field (8), when electrical current is prevented from flowing through the addressed pixel which is thereby permitted to cool and achieve a strong resonance profile (19). The processing unit (4) is arranged, in use of the apparatus (1), to maintain all of the non-addressed pixels of the pixel array (6) in an "off" state in which current is permitted to flow through them thereby to maintain them in a relatively heated state associated with the shallow and broad resonance profile (20) of FIG. 2.

Figure 6:
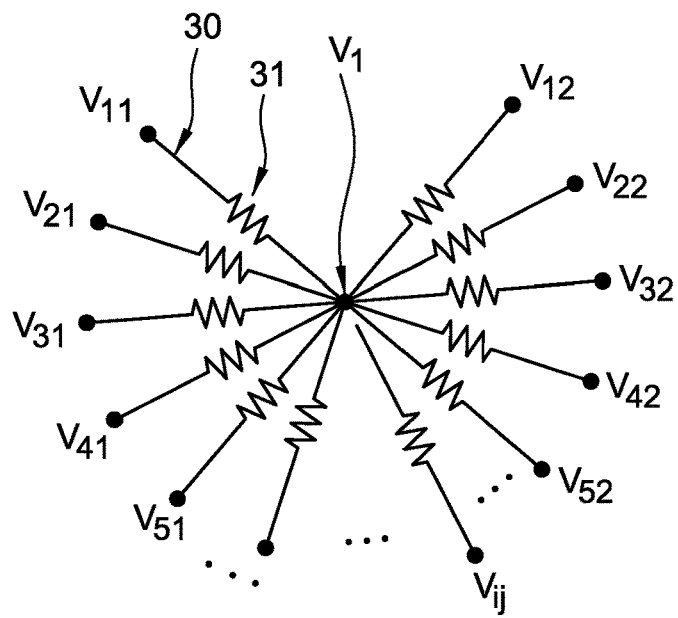
FIG. 6 schematically illustrates an equivalent circuit diagram for the array of electronically addressable pixels within the imaging apparatus of FIG. 5.

FIG. 6 schematically illustrates an equivalent circuit diagram corresponding to the array of FIG. 5, in terms of a network of resistors. With this notional equivalent diagram, useful for understanding the embodiment, each pixel (31) is notionally represented as a resistor element which Ohmically heats in response to an electrical current through it. Each conductive track (30) is notionally represented as a circuit line section and each extends radially outwardly from a common connection point to which a common voltage $V_1$ is applied. This is the voltage applied to the conductive line of the sub-array to which each conductive tack is connected. The terminal end of each circuit line section has applied to it a respective voltage $V_{ij}$. If $V_{ij}=V_1$ then substantially no potential difference (voltage) is generated across the addressed pixel (i,j), thereby inhibiting or preventing a flow of current through the pixel. Conversely, when $V_{ij}>V_1$ or $V_{ij}<V_1$, a current flows to heat the pixel at location (i,j). Another simple way to allow each pixel of the pixel array to be addressed individually is to remove each conductive line (32) thereby to render each conductive track (30) in electrical isolation from any of the other conductive tracks containing a pixel. The voltage $V_1$ may be applied to one terminal end of the isolated track for a given pixel, and the voltage $V_{ij}$ may be applied to the opposite end of the track. The pixel in question may be addressed by changing $V_{ij}$ to differ from $V_1$, or otherwise, to control current flow/heating therein. Thus, independent connect each one of the pixels, i.e. independently of any of the other pixels of the array, is possible.

Figure 7:
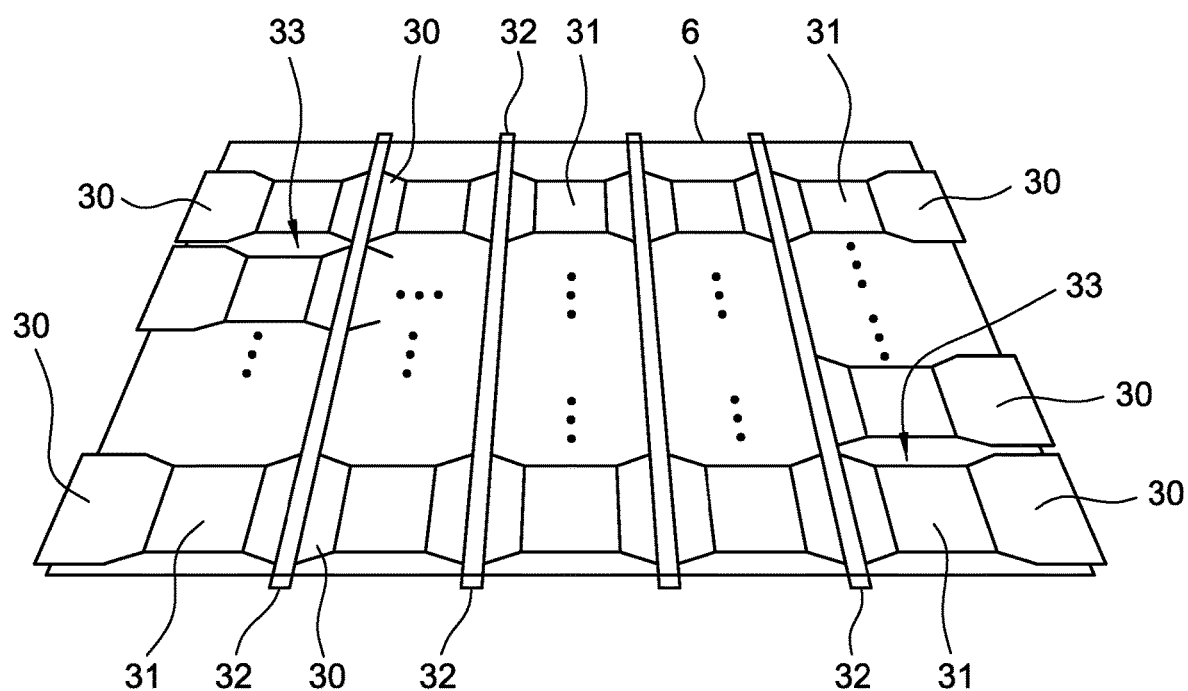
FIG. 7 schematically illustrates an array of electronically addressable pixels within the imaging apparatus of FIG. 1A, 1E, 11 or 12, according to an alternative embodiment.

FIG. 7 schematically illustrates another example of the array (6) of electronically addressable pixels of the apparatus of FIG. 1A or FIG. 1E (or FIG. 11 or FIG. 12 or FIG. 13). The array comprises a plurality of parallel conductive lines (30) comprising any suitable metal, preferably gold or silver, each comprising a plurality of pixels (31) formed at regular intervals along the conductive line in question. These pixels each consist simply of a narrowing of the cross-sectional area of the conductive line over a distance along the conductive line corresponding to the dimension of the pixel in that direction. The narrowing of cross-sectional area is achieved by narrowing the conductive track in two of its three dimensions: namely in a first dimension transverse to the conductive track but lying within the plane of the pixel array; and concurrently in a second dimension perpendicular to both the conductive track and the plane pixel array. The transverse direction of the pixel simply the width of the conductive line in question.

FIG. 4 illustrates, schematically, the cross-sectional view of a conductive line (30) illustrated a narrowing of the thickness of the conductive line at a pixel (31), as also described above with reference to FIGS. 3 and 5.

Across each of the conductive tracks (30) extends a plurality of conductive lines (32) (e.g. formed from gold, silver or other suitably conductive material), which are in electrical communication with each of the conductive tracks (30) they individually extend across in a direction perpendicular to the conductive line in question. An individual pixel (31) may be addressed within this array, by applying an electrical potential to an end of any one of the conductive lines (32), and concurrently applying an electrical potential to an end of any one of the conductive tracks (30). When the two electrical potentials are substantially the same, then substantially no potential difference (voltage) is generated across the addressed pixel, thereby inhibiting or preventing a flow of current through the pixel. Conversely, when the 2 applied electrical potentials differ, then a voltage is generated across the pixel thereby permitting a flow of current through the pixel.

As described above with reference to the pixels of the arrays illustrated in FIGS. 3 and 5, due to the narrowing of the dimensions of the conductive track at the location of the pixel, current conducted through the pixel has a higher current density than in other parts of the conductive track thereby causing a heating of the conductive track locally at the pixel through which current is caused to flow. However, when conditions are controlled such that no electrical current flows through the pixel, then the temperature of the pixel falls. Referring again to FIG. 2, when a current is caused to flow through a pixel, and the pixel is consequentially heated, the resonance profile is represented by the broad and shallow profile (20) illustrated in FIG. 2. Conversely, when current is prevented from flowing through the pixel, and the pixel is consequentially allowed to cool, the resonance profile associated with the cooler pixel is represented by the narrower and deeper resonance profile (19) illustrated in FIG. 2.

Thus, a pixel of the pixel array is addressed by the processing unit (4) of the apparatus of FIG. 1A or FIG. 1E (or FIG. 11 or FIG. 12 or FIG. 13), so as to be switched "on" to generate the salient evanescent electromagnetic field (8), when electrical current is prevented from flowing through the addressed pixel which is thereby permitted to cool and achieve a strong resonance profile (19). The processing unit (4) is arranged, in this example of a use of the apparatus (1), to maintain all of the non-addressed pixels of the pixel array (6) in an "off" state in which current is permitted to flow through them thereby to maintain them in a relatively heated state associated with the shallow and broad resonance profile (20) of FIG. 2.

The condition that a pixel is in the "on" when no current flows, but in the "off" state when current is caused to flow, results from the initially chosen resonance angular position of incident optical radiation. In this example, the optical radiation (13) angle of incidence is chosen to be resonant when no current flows (profile 19 of FIG. 2). The pixels are "on" when there is no current/heating but "off" when there is current/heating. Alternatively, if one chooses the incoming angle of optical radiation (13) to be resonant when current does flow (profile 20 of FIG. 2), then the pixels are "on" when current/heating flows but "off" when current does not flow.

In the present embodiment, in the "off" state, when a pixel is heated, the resonance angle of the associated resonance profile (20) is e.g. at a higher angular position. However, the angle of incidence of optical radiation (13) employed to illuminate the pixel array (6) is fixed in the apparatus of FIG. 1A or FIG. 1E (or FIG. 11 or FIG. 12 or FIG. 13), and so a surface plasmon resonance is not achieved when the pixel is heated. Consequently, the evanescent field of the surface plasmon, being non-resonant, is very much smaller and less pronounced than it would be when the pixel is switched "on". This diminished evanescent field is ineffective in extending out from the pixel towards the sample (7) which, as a result, is not based by an evanescent field (8) and cannot efficiently scatter optical radiation (9) towards the objective lens (3) of the optical detector unit of the apparatus.

In the pixel array illustrated in FIG. 7, the current caused by providing a potential difference between a conductive track (30) defining one pixel row (row i), and a conductive line (32) defining one array column position (column j), will generally result in a flow of current principally through the addressed pixel (i,j). However, stray currents of lesser magnitude may also flow through adjacent pixels (31). These stray currents might lead to temperatures which in turn permit weak surface plasmons at non-addressed adjacent pixels which may induce cause the scattering of a relatively small proportion of light when interacting with any imaged sample (if present at the adjacent pixel). This may result in a modest lowering of image resolution as compared to the resolution achievable using other pixel array structures (e.g. see FIGS. 3, 5 and 9), yet still provide a higher imaging resolution than is achievable using existing imaging techniques.

Nevertheless, the effects of such stray currents may be accounted for by post-processing of raw image data from the optical detector (12), to de-convolve the optical effects of the stray currents according to a point-spread function pre-calibrated for each pixel prior to use of the imaging apparatus. To determine the point-spread function of a pixel (31) of the array of FIG. 7, one may place a calibration sample of known size and shape at the pixel in question, and detect the scattered light signal emanating from the pixel when it is addressed. The size of the calibration sample may preferably be the same size as the pixel in question so as to serve as a 'point source' of scattered light from a surface plasmon generated at the pixel in question when addressed.

Figure 8:
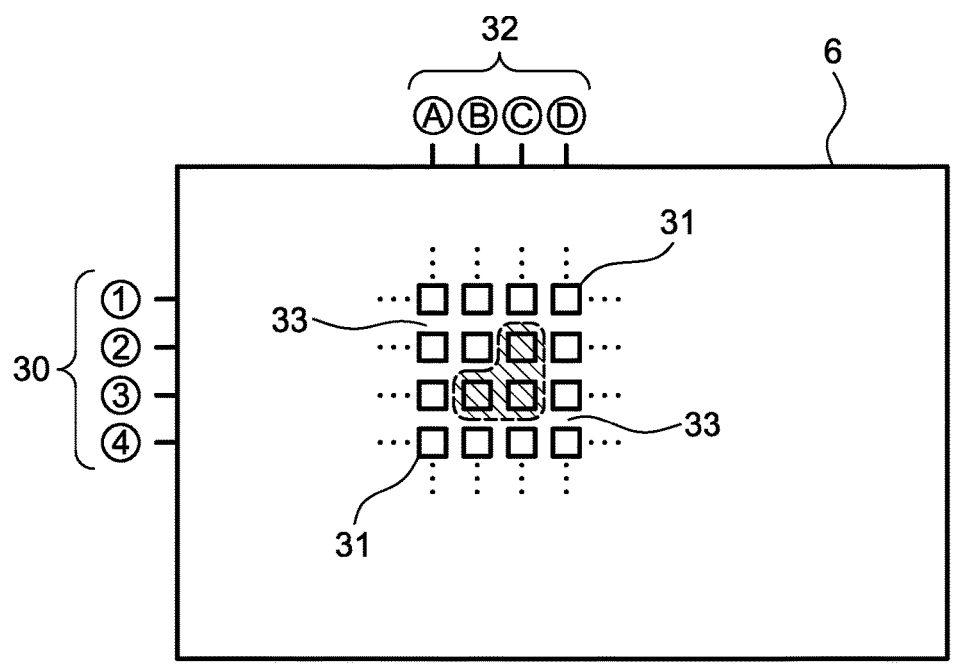
FIG. 8 schematically illustrates the array of electronically addressable pixels of any of FIGS. 3, 5 and 7.

By addressing individual pixels (31) of the array (6), one-by-one, the processing unit (4) is arranged to sample individual regions of the pixel array at a very high resolution. This is schematically illustrated in FIG. 8 which shows a 4×4 subset of pixels of the pixel array each addressable individually by the processor unit (4) in terms of the coordinates of the pixel (e.g. row 1; row 2; row 3; row 4: column A; column B; column C; column D). Only when pixels with the following coordinates are separately addressed does the processing unit receiver consequential signal from the optical detector (13) thereby indicating that the sample is adjacent the addressed pixel in question:
(2, C), (3, B), (3, C)

Figure 9:
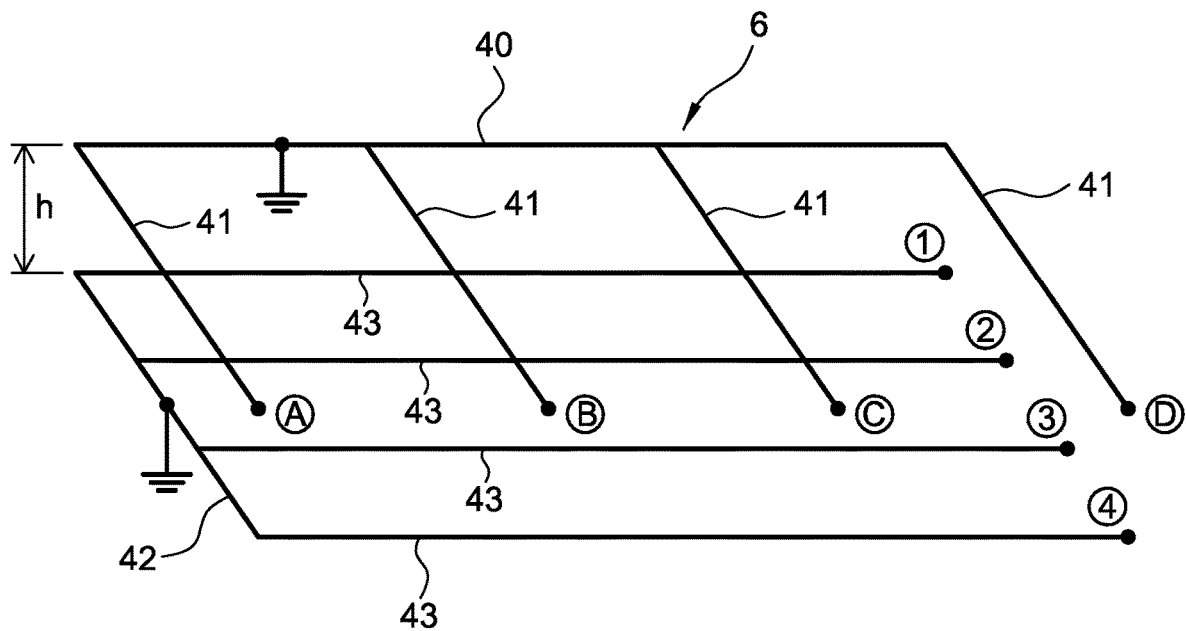
FIGS. 9 and 10 schematically illustrate an array of electronically addressable pixels within the imaging apparatus of FIG. 1A, 1E, 11 or 12, according to an alternative embodiment.

Consequently, the processing unit may build-up a pixel picture of the shape of the sample, and its size and location, based on the size and location of these 3 pixels and the shape formed by the 3 pixels collectively. In addition, the detector is able to detect not merely whether there is sample material or no sample material present at a given pixel location, but by detecting the differing brightness levels at different pixel locations, the detector is able to detect variations in the material of the sample (e.g. how opaque, degree of scattering). In addition, by detecting brightness variation across the pixel array, the detector may be able to detect if a pixel is only partially covered by sample material, as opposed to being against fully covered or not covered by sample material at all FIGS. 9 and 10 schematically illustrate an alternative arrangement for a pixel array (6) which may be employed in the apparatus of FIG. 1A or FIG. 1E (or FIG. 11 or FIG. 12 or FIG. 13), in place of the pixel array illustrated in FIG. 3.

In this arrangement, the pixel array is formed by two overlapping, planar arrays of parallel linear conductive lines (41, 43) spaced from one another in plane-parallel position across an intervening separation (h). Each conductive line of any one of the two arrays terminates at one end, at a common respective ground terminal (40, 42), and terminates at the other end that an individual respective addressing terminal (A, B, C, D; 1, 2, 3, 4) electrically isolated from any of the other addressing terminals. A notional pixel is defined where one conductive line (41) of one of the two planar arrays crosses a conductive line (43) of the other of the two planar arrays, when viewed along a line of you perpendicular to the plane of the two arrays (which are parallel).

By applying an electrical potential at an addressing terminal, a potential difference is created between the addressing terminal and the common ground terminal of the array of conductive lines in question, permitting current to flow through the conductive line possessing that addressing terminal. The presence of this current causes the conductive lines to heat and, as described with reference to FIG. 2, to cause surface plasmons generated along that conductive line, by incident optical radiation (13), to be non-resonant (or to become resonant depending on the initial state). This places the conductive line in an "off" state. The processing unit (4) is arranged to apply an electrical potential to all non-addressed conductive lines to maintain them in this "off" state, and to address a selected conductive line to switch it to an "on" state by removing the electrical potential thereby preventing the flow of current and allowing the conductive lines to cool so as to permit the surface plasmons upon it to become resonant with the incident optical radiation (30) upon them. When resonant, a salient evanescent electromagnetic field is thereby generated which may be a sample (item 7; FIG. 10) placed upon the pixel array to cause optical radiation to be scattered by it for collection by the optical detector (12).

The location of the sample (7) may be determined by the processing unit (4) as follows. Each of the conductive lines (41, 43) is addressed separately and individually, line-by-line, by successively removing the electrical potential applies to the respective addressing terminals (A, B, C, D; 1, 2, 3, 4) of those lines to switch the line to an "on" state. In this schematic example of FIG. 10, consequence of this operation would be that scattered light would be detected by the optical detector unit (12) when conductive line (2) of lower array of lines (43) was addressed/switched to an "on" state, and when the conductive line (C) of the upper array of lines (41) was addressed/switched to an "on" state. The processing unit (4) is thereby able to deduce that the sample must reside at the coordinate position (2, C) within the coordinates system of the pixel array (6). The system is able to detect also how opaque the sample is, at each of the addressed pixels where the sample is present, and to what degree a pixel is covered. If multiple different fluorophores are also used in labelling the sample, the method can also distinguish e.g. what part of the cell/which organelles are located above/adjacent to the addressed pixel.

FIG. 11 schematically illustrates an imaging apparatus according to an alternative embodiment of the invention in which surface plasmons (SP) are excited in an array of electronically addressable pixels within the imaging apparatus, by light coupled to one end/side of the array at an edge thereof. In particular, an 'End-Fire' coupling arrangement is employed instead of the mechanism of matching the photon and SP momenta employed in the embodiment of FIG. 1E. Rather, in this embodiment, the spatial electromagnetic field profiles of the incident photons from the light source (15) are matched to the spatial electromagnetic field profiles of SPs. An optical system (51) is arranged to receive light (13) from the light source (15) and to focus on an end facet of the pixel array (6) which is disposed on an upper surface of a dielectric substrate (e.g. transparent/transmissive optically) so that it overlaps well with the fields of SPs of the pixel array. Preferably, the focused incident optical radiation (52) is a TM-polarised optical beam. Such polarised light couples more efficiently to SPs on the surface of the pixel array. In addition, optionally, a linear polarising filter (analyser) element (54) may be arranged in front of the optical detector unit (12) which oriented to block optical radiation resulting from the direct scattering (Rayleigh Scattering) of incident radiation (52) from the light source. Such Rayleigh-scattered light is highly polarised and can be removed from the light incoming to the optical detector unit (12), whereas light (10) generated by the interaction of a SP with a sample (7) is not polarised in the same way and may be transmitted through the linear polarising filter (54). Furthermore, the use of such a polarising filter may be made in any embodiment described herein so as to enhance image contrast. This may be achieved by adjusting the position angle (i.e. of the polarising axis of the filter) to favour the preferred polarisation of light scattered from the evanescent field of surface plasmons, by the imaged sample. The optical system (51) may be a system of one or more lenses and/or may comprise an end of an optical fibre (e.g. but-coupled to the end facet of the substrate 50).

FIG. 12 illustrates a further optional implementation of an embodiment of the invention. Here, excitation light for exciting surface plasmons is directed through the same optics used to collect the light scattered from plasmons by a sample. In particular, light (70) from the light source (15) is directed to a 45 degree dichroic mirror (71) (Note: a half-silvered mirror is an alternative) which reflects that light to the objective lens (3) which, in turn, directs the light on to the pixel array (6) to excite plasmons. The plasmon excitation process is according to the 'grating' and/or 'rough surface' excitation regime described above. The dichroic mirror is arranged to transmit light (11) scattered from surface plasmons, which generally has a wavelength different to that of the excitation light wavelength. This allows the scattered light to reach the optical detector unit (12), via the objective lens and the dichroic mirror. Back-scattered light (70) originating from the light source (15), and scattered by the sample or the pixel array towards the objective lens and dichroic mirror, along with plasmon-originating light (11) is prevented from reaching the detector by the dichroic mirror. A filter (54) is optionally placed in the optical path between the dichroic mirror and the optical detector unit (12), and may either be a polaroid filter positioned to be sympathetic to the polarisation of scattered light which is plasmon-originating, or may be a colour filter arranged to block the wavelength of the excitation light (70).

The "dichroic mirror" operates based on the principle of thin-film interference (as is well known in the art) and has a high reflectivity for the excitation source wavelength and a high transmission for the light scattered back from surface plasmons on the pixel array (e.g. of the order of 90% transmission). This is particularly conducive to fluorescence microscopy because, in that case, the information-bearing light is red-shifted in comparison to the excitation wavelength. Consequently, one may employ a long-pass dichroic mirror (sometimes also referred to as a dichroic beamsplitter). However, other spectroscopic techniques (e.g. Raman Anti-stokes) may require a short-pass dichroic mirror, as appropriate.

The optional use of a polarising filter (54) may allow light polarisation instead of light wavelengths to be used for discrimination. Alternatively, or in addition, the beamsplitter/mirror may be birefringent so as to be arranged for reflecting light of a particular linear polarisation onto the pixel array and sample. Before the reflected, polarised light reaches the sample it may be passed through a quarter wave plate (Not shown) which would be located e.g. directly below the beamsplitter/mirror, which changes the linear polarisation of that light into a circular polarisation state. Scattered light from the sample travelling back towards the quarter-wave plate will pass through the quarter-wave plate for a second time which changes the circular polarisation state in to a linear polarisation state again. However, the orientation of the linear polarisation state produced in this way is orthogonal to the original linear polarisation state of the light initially reflected from the birefringent dichroic mirror. This final linear polarisation state/orientation is not reflected by the birefringent mirror but, instead is transmitted by that mirror. This technique permits discriminating excitation light from detection light without restrictions to the useful wavelength range and can also be used for elastic scattering.

In any of the above embodiments, optionally, a transparent dielectric cover layer may be disposed over the top of the pixel array as a protective layer. In some embodiments, this may result in the pixel layer being sandwiched between two dielectric layers collectively acting as a waveguide.

The invention claimed is:

1. An imaging apparatus for imaging a sample comprising:
an array of electronically addressable pixels wherein each pixel is arranged to support a surface plasmon resonance therein to generate an evanescent electromagnetic field which extends transversely from the pixel so as to be salient from the array at a first side of the array for illuminating the sample at said first side;
a light source arranged to illuminate the array with excitation light therewith to generate said surface plasmon resonance(s);
an optical detector arranged for detecting optical radiation from a second side of the array which is opposite to said first side thereof, in response to illumination of the array by said excitation light;

a processing unit arranged to associate the detected optical radiation with the address of the pixel or pixels within the array at which the surface plasmon resonance(s) was generated; and an optically transparent light guide part upon a first surface of which the array of pixels is disposed wherein the optical detector is disposed adjacent a separate second surface of the light guide part in optical communication with the array of pixels therethrough.

2. An imaging apparatus according to claim 1 in which the optical detector is arranged for detecting excitation light reflected at said second side of the array.

3. An imaging apparatus according to claim 1 in which the light source is arranged to inject said excitation light into the light guide part at an angle to cause total internal reflection of the excitation light internally at the first surface sufficient to excite said surface plasmon resonance(s) in the array of pixels disposed thereupon externally.

4. An imaging apparatus according to claim 1 in which the optical detector is arranged to for detecting said optical radiation across an area extending over said second surface sufficient to oppose all of those parts of the first surface upon which pixels of the array of pixels are disposed.

5. An imaging apparatus according to claim 1 in which the thickness of the light guide part as between the first and second surfaces thereof, is substantially uniform such that the array of pixels oppose the optical detector in parallel opposition thereto across the uniform thickness of the light guide part.

6. An imaging apparatus according to claim 1 in which the optical detector is arranged for detecting luminescence light excited by the evanescent electromagnetic field in the sample at said first side of the array.

7. An imaging apparatus according to claim 1 in which the optical detector is arranged for detecting light scattered from the evanescent electromagnetic field by the sample at said first side of the array.

8. An imaging apparatus for imaging a sample comprising:

an array of electronically addressable pixels wherein each pixel is arranged to support a surface plasmon resonance therein to generate an evanescent electromagnetic field which extends transversely from the pixel so as to be salient from the array at a first side of the array for illuminating the sample at said first side;

a light source arranged to illuminate the array with excitation light therewith to generate said surface plasmon resonance(s);

an optical detector arranged for detecting optical radiation from a second side of the array which is opposite to said first side thereof, in response to illumination of the array by said excitation light;

a processing unit arranged to associate the detected optical radiation with the address of the pixel or pixels within the array at which the surface plasmon resonance(s) was generated;

wherein the processing unit is arranged to address a said pixel to reversibly change the temperature of the pixel from a first temperature value to a second temperature value sufficiently different to the first temperature value to render said surface plasmon non-resonant or further from resonance thereby to diminish said evanescent electromagnetic field.

9. An imaging apparatus according to claim 8 wherein:

the processing unit is arranged to reversibly change said temperature from said first temperature value to said second temperature value repetitively with a predetermined repetition frequency.

10. An imaging apparatus according to claim 9 wherein:

the processing unit is arranged to reversibly change said temperature of a plurality of said pixels concurrently from said first temperature value to said second temperature value repetitively each with a different respective predetermined repetition frequency.

11. An imaging apparatus according to claim 9 wherein:

the processing unit is arranged to detect a repetitive change in the detected optical radiation which changes with a repetition frequency corresponding to the predetermined repetition frequency associated with the addressed pixel, and to associate the detected repetitive change with the address of the addressed pixel.

12. An imaging method for imaging a sample comprising:

providing an array of electronically addressable pixels wherein each pixel is arranged to support a surface plasmon resonance therein to generate an evanescent electromagnetic field which extends transversely from the pixel so as to be salient from the array at a first side of the array for illuminating the sample at said first side;

illuminating the array with excitation light to generate said surface plasmon resonance(s);

electronically addressing a said pixel(s);

detecting optical radiation from a second side of the array which is opposite to said first side thereof, in response to illumination of the array by said excitation light; and associating the detected optical radiation with the address of the pixel or pixels within the array at which the surface plasmon resonance was generated;

wherein said illuminating the array of pixels includes optically guiding excitation light through an optically transparent light guide part upon a first surface of which the array of pixels is disposed and said detecting is performed via a separate second surface of the light guide part in optical communication with the array of pixels.

13. An imaging method according to claim 12 in which the detecting comprises detecting excitation light reflected at said second side of the array.

* * * * *